(12) United States Patent
Tanaka et al.

(10) Patent No.: US 7,476,712 B2
(45) Date of Patent: Jan. 13, 2009

(54) FILM AND PROCESS FOR PRODUCING THE SAME

(75) Inventors: Hideaki Tanaka, Ibaraki (JP); Hiroyuki Oba, Ibaraki (JP); Masahiro Yamazaki, Ibaraki (JP); Tomohisa Hasegawa, Ibaraki (JP)

(73) Assignee: Kureha Corporation, Tokyo (JP)

( * ) Notice: Subject to any disclaimer, the term of this patent is extended or adjusted under 35 U.S.C. 154(b) by 466 days.

(21) Appl. No.: 10/511,893

(22) PCT Filed: Apr. 23, 2003

(86) PCT No.: PCT/JP03/05173

§ 371 (c)(1), (2), (4) Date: Jan. 19, 2005

(87) PCT Pub. No.: WO03/091317

PCT Pub. Date: Nov. 6, 2003

(65) Prior Publication Data

US 2005/0131162 A1 Jun. 16, 2005

(30) Foreign Application Priority Data

Apr. 23, 2002 (JP) ............................. 2002-121246

(51) Int. Cl.
*C08F 8/42* (2006.01)
*C08F 20/04* (2006.01)
*C08F 20/06* (2006.01)

(52) U.S. Cl. ................... 525/330.2; 525/360; 525/366; 525/367; 525/368; 525/369; 525/370; 525/371; 525/372; 525/373; 525/329.7; 526/317.1

(58) Field of Classification Search ................ 525/360, 525/366, 367, 368, 369, 370, 371, 372, 373, 525/329.7, 330.2
See application file for complete search history.

(56) References Cited

U.S. PATENT DOCUMENTS 6,605,344 B1 * 8/2003 Ohba et al. ................. 428/332

FOREIGN PATENT DOCUMENTS

| EP | 560369 | 9/1993 |
|---|---|---|
| EP | 0 890 432 | 1/1999 |
| EP | 1086981 | 3/2001 |
| JP | 6-107874 | 4/1994 |
| JP | 7-102016 | 4/1995 |
| JP | 8-176316 | 7/1996 |
| JP | 9-221571 | 8/1997 |
| WO | 99/52973 | * 10/1999 |

* cited by examiner

*Primary Examiner*—Roberto Rábago
(74) *Attorney, Agent, or Firm*—Nixon & Vanderhye PC

(57) ABSTRACT

The invention is directed to a film which comprises a poly (carboxylic acid) polymer and a polyvalent metal compound, which is endowed with excellent gas barrier property against, for example oxygen, which has such resistance that the appearance, shape, and gas-barrier properties are not impaired by neutral water, high-temperature water vapor, or hot water; a laminate produced by use of the film; and a process for producing the film or laminate industrially conveniently at low cost. The film or laminate of the present invention is suitable for use as a package, packaging container, or vacuum insulation material for articles which are apt to be deteriorated by oxygen, etc., such as foods, beverages, chemicals, medicines, and metallic precision parts; e.g., electronic parts. Furthermore, there can be provided a packaging material suitable for use with articles which are required to be reliably insulated from gases for prolonged periods and should be treated under high-temperature, hot-water conditions as in boiling or pressurized high-temperature sterilization.

26 Claims, No Drawings

FILM AND PROCESS FOR PRODUCING THE SAME

This application is the US national phase of international application PCT/JP03/05173 filed 23 Apr. 2003 which designated the U.S. and claims benefit of JP 2002-121246, dated 23 Apr. 2002, the entire content of which is hereby incorporated by reference.

TECHNICAL FIELD

The present invention relates to a film which comprises, as an essential component, a poly(carboxylic acid) polymer such as poly(meth)acrylic acid, and which can be readily produced on an industrial scale at low cost; to a laminate comprising the film; to a precursor of the laminate; to a method for producing the film or the laminate; and to use of the film or the laminate. More particularly, the present invention relates to a film which comprises a poly(carboxylic acid) polymer and a polyvalent metal compound, which exhibits excellent gas (e.g., oxygen)-barrier properties, and which has resistance such that the appearance, shape, and gas-barrier properties are not impaired by neutral water, high-temperature water vapor, or hot water; to a gas-barrier laminate comprising the film; to a precursor of the gas-barrier laminate; to a method for readily producing the film or the laminate on an industrial scale at low cost; and to use of the film or the laminate.

Since the film or laminate of the present invention exhibits the aforementioned characteristics, the film or laminate is suitable for use as a packaging material, packaging container, or vacuum heat-insulating material for articles which are readily impaired by, for example, oxygen, including foods, beverages, chemicals, drugs, and precision metallic parts such as electronic parts. In addition, the film or laminate is suitable for use as a packaging material for articles which require long-term reliable gas-barrier properties, and require treatment (e.g., boiling or retort sterilization) in high-temperature hot water. Meanwhile, the film of the present invention is easily dissolved in an acid or an alkali under specific conditions, and exhibits good disposability; i.e., separation/recovery of the film can be readily carried out upon disposal thereof. Therefore, among the aforementioned uses of the film, the film is particularly suitable for use in the field where a packaging material must be separated/recovered.

BACKGROUND ART

Polymers containing in the molecule a group which has high hydrophilicity and readily forms a hydrogen bond, such as poly(meth)acrylic acid and polyvinyl alcohol, are known as gas-barrier polymers. Although a film formed solely from such a polymer exhibits excellent gas (e.g., oxygen)-barrier properties under dry conditions, the film exhibits very poor gas (e.g., oxygen)-barrier properties under high humidity, because of the hydrophilic property of the polymer. In addition, such a polymer has poor resistance to moisture or hot water (e.g., the polymer dissolves in hot water), and such poor moisture or hot water resistance imposes a limitation on the industrial use of the polymer as a gas-barrier resin. The moisture or hot water resistance of poly(meth)acrylic acid or polyvinyl alcohol is described in Comparative Examples of Japanese Patent Application Laid-Open (kokai) No. 06-220221 (U.S. Pat. No. 5,552,479) filed by the present inventors.

In an attempt to solve the aforementioned problems, the present inventors have proposed a film product exhibiting excellent gas-barrier properties even at high humidity, the film product being produced by subjecting, to thermal treatment under specific conditions, a film formed from the following mixture: a mixture of poly(meth)acrylic acid and polyvinyl alcohol (Japanese Patent Application Laid-Open (kokai) No. 06-220221), a mixture of partially neutralized poly(meth)acrylic acid and polyvinyl alcohol (Japanese Patent Application Laid-Open (kokai) No. 07-102083 (U.S. Pat. No. 5,574,096)), or a mixture of a sugar, and poly(meth)acrylic acid or partially neutralized poly(meth)acrylic acid (Japanese Patent Application Laid-Open (kokai) No. 07-165942 (U.S. Pat. No. 5,498,662)).

Meanwhile, researchers other than the present inventors have proposed, for example, a gas-barrier resin composition characterized by prepared through chemical treatment, by means of heat and active energy beams, of a composition containing a carboxyl-group-containing resin which readily forms a hydrogen bond (specifically, a poly(meth)acrylic acid polymer), a hydroxyl-group-containing resin which readily forms a hydrogen bond (specifically, a sugar), and an inorganic layered compound (Japanese Patent Application Laid-Open (kokai) No. 10-231434); and a resin composition characterized by containing a water-soluble polyacrylic acid compound, polyvinyl alcohol, and an inorganic layered compound, which composition exhibits excellent gas barrier properties at a relative humidity (Japanese Patent Application Laid-Open (kokai) No. 11-246729).

Regarding films formed solely from a polyacrylic acid polymer, for example, Japanese Patent Application Laid-Open (kokai) No. 2001-19782 discloses a film which is formed from partially neutralized polyacrylic acid, which contains no polyvinyl alcohol, and which exhibits improved oxygen gas-barrier properties through electron beam irradiation.

Although a film produced through any of the aforementioned known techniques exhibits excellent gas-barrier properties at high humidity, the film has unsatisfactory resistance to high-temperature water vapor or hot water. These known techniques are focused on chemical treatment of a mixture of a poly(meth)acrylic acid polymer and a polyalcohol polymer, or chemical treatment of a polyacrylic acid polymer, by means of heat, active energy beams, electron beams, or the like. However, when such treatment is carried out, the resultant film is not easily dissolved in an acid or an alkali, and therefore, separation/recovery or recycling of the film becomes difficult upon disposal thereof.

In an attempt to enhance the high-temperature water vapor resistance or hot water resistance of a film formed from a poly(carboxylic acid) polymer and a polyalcohol polymer, the present inventors have further proposed a resin composition containing a reaction product formed from a poly(meth)acrylic acid polymer, a polyalcohol polymer, and a polyvalent metal (Japanese Patent Application Laid-Open (kokai) No. 10-237180 (U.S. Pat. No. 6,143,384)). Specifically, Japanese Patent Application Laid-Open (kokai) No. 10-237180 discloses a gas-barrier resin composition characterized by having a chemical structure including an ester bond formed through reaction between a poly(meth)acrylic acid and a polyalcohol, and an ionic bond formed between the poly(meth)acrylic acid and polyvalent metal ions. This publication discloses that when the amounts of ester bonds and ionic bonds are limited to fall within specific ranges, the resultant film exhibits resistance to high-temperature water vapor or hot water. Japanese Patent Application Laid-Open (kokai) No. 10-237180 also discloses a method for forming an ester bond between a poly(meth)acrylic acid and a polyalcohol by means of thermal treatment; and a method for forming an ionic bond between the poly(meth)acrylic acid and polyvalent metal ions by immersing a mixture of the thermally treated poly(meth)acrylic acid and polyalcohol in water containing a polyvalent metal compound.

The present inventors have also proposed a film containing a poly(carboxylic acid) polymer and a polyalcohol polymer, which film is produced by means of a simpler method and exhibits enhanced resistance to high-temperature water vapor or hot water (Japanese Patent Application Laid-Open (kokai) No. 2000-931 (European Patent No. 1086981A1)). Specifically, Japanese Patent Application Laid-Open (kokai) No. 2000-931 discloses a film produced by applying a layer containing a metallic compound onto the surface of a molded product layer formed of a mixture of a poly(meth)acrylic acid polymer and a polyalcohol polymer. This publication discloses that the aforementioned method readily produces a film exhibiting enhanced gas (e.g., oxygen)-barrier properties and enhanced resistance to high-temperature water vapor or hot water.

Japanese Patent Application Laid-Open (kokai) Nos. 10-237180 and 2000-931 disclose that a polyvalent metal compound is caused to act on a mixture of a poly(meth)acrylic acid polymer and a polyalcohol polymer, and that the resultant gas-barrier resin composition or the resultant film exhibits resistance to high-temperature water vapor or hot water. However, in order to impart sufficient oxygen gas-barrier properties, high-temperature water vapor resistance, and hot water resistance to the gas-barrier resin composition or film, the poly(meth)acrylic acid polymer-polyalcohol polymer mixture must be chemically treated by means of a predetermined treatment such as thermal treatment. In the case where the mixture is incompletely treated; i.e., the thus-treated mixture contains polyalcohol, even when a polyvalent metal compound is caused to act on the mixture, the resultant film may fail to exhibit sufficient oxygen gas-barrier properties and resistance to high-temperature water vapor or hot water. Thus, the poly(meth)acrylic acid polymer-polyalcohol polymer mixture must be chemically treated by means of, for example, heat. However, when such treatment is carried out, the resultant film is not easily dissolved in an acid or an alkali, and therefore, separation/recovery of the film becomes difficult upon disposal thereof.

Next will be described techniques for causing a polyvalent metal compound to act solely on a poly(carboxylic acid) polymer, which techniques do not necessarily relate directly to the aforementioned film-related technical field. A mixture of polyacrylic acid and a polyvalent metal compound is publicly disclosed by, for example, the following academic publications: A. Ikegami, Journal of Polymer Science, Vol. 56, p. 133 (1962), Yasuo Goto, SEN'I GAKKAISI, Vol. 55, No. 11, pp. 522-527 (1999), and L. E. Nielsen, Polymer Engineering and Science, Vol. 9, No. 5 (1969). A. Ikegami, et al. have reported formation of precipitates by causing a divalent metal compound to act on an aqueous sodium polyacrylate solution. As has been reported, polyacrylic acid readily reacts with a polyvalent metal compound in an aqueous solution. Yasuo Goto, et al. and L. E. Nielsen, et al. have reported a method in which a polyvalent metal compound is reacted with an aqueous polyacrylic acid solution, and the thus-formed polyacrylic acid polyvalent metal salt is subjected to compression molding at very high pressure. As has been reported, a polyacrylic acid polyvalent metal salt can be readily formed by the mediation of an aqueous polyacrylic acid solution. However, difficulty is encountered in forming a uniform film-like molded product by means of this method. In addition, molding of the thus-formed polyacrylic acid polyvalent metal salt requires application of high pressure.

Attempts have been made to form a film from a polyacrylic acid polyvalent metal salt, as described in, for example, the following academic publication: A. Claudio Habert, Journal of Applied Polymer Science, Vol. 24, pp. 489-501 (1979). A. Claudio Habert, et al. have reported a method in which an aqueous polyacrylic acid solution is spread on a glass plate, and the aqueous-solution-spread plate is immersed in a polyvalent metal compound solution, to thereby react polyacrylic acid with the polyvalent metal. This method successfully produces a uniform film under specific conditions when a compound of a specific metal (e.g., Al) is employed. However, as has been reported, difficulty may be encountered in forming a uniform film, depending on the type of a polyvalent metal compound to be employed or reaction conditions, since this method employs reaction between an aqueous polyacrylic acid solution and a polyvalent metal compound solution (i.e., solution-solution reaction).

Next will be described techniques relating to a coating liquid prepared by causing a polyvalent metal compound to act on a poly(carboxylic acid) polymer, which techniques also do not necessarily relate directly to the aforementioned film-related technical field. For example, Japanese Patent Application Laid-Open (kokai) No. 54-82416 discloses a pigment dispersant for forming coated paper, the dispersant containing an aqueous solution prepared by reacting a compound of a polyvalent metal (e.g., calcium, aluminum, or zinc) with a polymer or copolymer formed from an $\alpha,\beta$-monoethylenic unsaturated carboxylic acid, and/or an alkali metal salt or ammonium salt of the polymer or copolymer. Japanese Patent Application Laid-Open (kokai) No. 5-263046 discloses a method for producing a coating agent composition, which method is characterized in that a film-forming agent and/or a plasticizer is added to an emulsion containing a polymer having an acid value of 20 to 200, the polymer being produced through polymerization of an ethylenic unsaturated monomer; and subsequently a polyvalent metal compound is added in an amount of 0.05 to 0.9 chemical equivalents (hereinafter may be referred to simply as "eq") on the basis of the acid value of the polymer, thereby reacting the compound with the polymer. Japanese Patent Application Laid-Open (kokai) No. 8-176316 discloses an alkali-soluble film and an alkali-soluble coating agent, each of which contains a polyvalent metal and a polymer produced through non-aqueous polymerization of an $\alpha,\beta$-unsaturated carboxylic acid monomer and at least one vinyl-group-containing monomer. In these known techniques, a coating liquid is prepared through, for example, addition of an alkali metal or ammonia to an aqueous poly(carboxylic acid) polymer solution, employment of a poly(carboxylic acid) polymer in the form of emulsion, or employment of a copolymer formed from an $\alpha,\beta$-unsaturated carboxylic acid monomer and a vinyl-group-containing monomer. However, when a film is formed only through application of such a coating liquid onto a support, the resultant film fails to exhibit satisfactory gas (e.g., oxygen)-barrier properties and resistance to high-temperature water vapor or hot water.

Conventional techniques relating to, for example, a gas-barrier film formed from a poly(carboxylic acid) polymer have been described so far with reference to the laid-open patent publications and academic publications. In summary, in the case where a film exhibiting excellent gas (e.g., oxygen)-barrier properties even at high humidity and having resistance to high-temperature water vapor or hot water is to be formed from a poly(carboxylic acid) polymer, there may be employed a method in which a mixture of a poly(carboxylic acid) polymer and a polyalcohol polymer is chemically modified through, for example, thermal treatment, and a polyvalent metal is caused to act on the resultant mixture. However, in a film formed through this method, an ester bond is formed between the poly(carboxylic acid) polymer and the polyalcohol polymer through such a chemical treatment. Therefore, the film is not easily dissolved in an acid or an alkali, and separation/recovery of the film becomes difficult. Meanwhile, there has been described a technique in which a polyvalent metal compound is caused to act solely on a poly(carboxylic acid) polymer, without mixing of the polymer with a polyalcohol polymer and without chemical treatment of the polymer through, for example, thermal treatment. However, even when a film is formed from a poly(carboxylic acid) polymer through such a technique, a limitation is imposed on the industrial use of the film.

Objects of the present invention are to provide a film which can be readily produced on an industrial scale at low cost, which exhibits excellent gas (e.g., oxygen)-barrier properties even in a high-humidity atmosphere, which has water resistance such that the appearance, shape, and gas-barrier properties are not impaired by neutral water, high-temperature water vapor, or hot water, which is easily dissolved in an acid and/or an alkali, and which exhibits good disposability; i.e., separation/recovery of the film can be carried out upon disposal thereof; to provide a laminate comprising the film; to provide a method for producing the film or the laminate; and to provide use of the film or the laminate.

DISCLOSURE OF THE INVENTION

The present inventors have conducted extensive studies, and as a result have found that, in a film comprising, as raw materials, a poly(carboxylic acid) polymer—a film formed therefrom exhibits a specific oxygen permeation coefficient—and a polyvalent metal compound, when a specific amount of carboxyl groups of the polymer constituting the film and the polyvalent metal together form a salt, the resultant film exhibits excellent gas (e.g., oxygen)-barrier properties even in a high-humidity atmosphere, exhibits water resistance such that the appearance, shape, and gas-barrier properties are not impaired by neutral water, high-temperature water vapor, or hot water, and is easily dissolved in an acid and/or an alkali. The present inventors have also found that the aforementioned problems can be solved by providing the film. The present invention has been accomplished on the basis of these findings.

Accordingly, a first invention provides a film derived from a poly(carboxylic acid) polymer (A) and a polyvalent metal compound (B) serving as raw materials, wherein the peak ratio ($A_{1560}/A_{1700}$) in an infrared absorption spectrum of the film is at least 0.25.

A second invention provides a film according to the first invention, which has at least one layer structure unit including a layer (a) formed of the poly(carboxylic acid) polymer (A) and a layer (b) formed of the polyvalent metal compound (B), with the layers (a) and (b) being adjacent to each other.

A third invention provides a film according to the second invention, which has at least one layer structure unit in which the layers (a) and (b) are adjacently arranged in the following order: layer (b)/layer (a)/layer (b) or layer (a)/layer (b)/layer (a).

A fourth invention provides a film according to the second or third invention, wherein the total amount (Bt) of the polyvalent metal compound (B) is at least 0.2 eq on the basis of the total amount (At) of carboxyl groups contained in all the layers (a) and (b) which are adjacent to each other.

A fifth invention provides a film according to the first invention, which is formed from a mixture containing the poly(carboxylic acid) polymer (A) and the polyvalent metal compound (B).

A sixth invention provides a film according to the fifth invention, wherein the amount of the polyvalent metal compound (B) is at least 0.2 eq on the basis of the amount of all the carboxyl groups contained in the poly(carboxylic acid) polymer (A).

A seventh invention provides a film according to any of the first through sixth inventions, wherein a film formed solely from the poly(carboxylic acid) polymer (A) exhibits an oxygen permeation coefficient of 1,000 cm$^3$(STP)·μm/(m$^2$·day·MPa) or less as measured at 30° C. and a relative humidity of 0%.

An eighth invention provides a film according to any of the first through seventh inventions, wherein the poly(carboxylic acid) polymer (A) is a homopolymer, a copolymer, and/or a mixture thereof, which contains at least one polymerizable monomer selected from among acrylic acid, maleic acid, and methacrylic acid.

A ninth invention provides a film according to any of the first through eighth inventions, wherein the polyvalent metal compound (B) is a divalent metal compound.

A tenth invention provides a film according to any of the first through ninth inventions, which is easily dissolved in an acid and/or an alkali.

An eleventh invention provides a film according to any of the first through tenth inventions, which has a thickness of 0.001 μm to 1 mm.

A twelfth invention provides a film according to any of the first through eleventh inventions, which is employed for a gas-barrier material.

A thirteenth invention provides a film according to any of the first through twelfth inventions, which exhibits an oxygen permeation coefficient of 1,000 cm$^3$(STP)·μm/(m$^2$·day·MPa) or less as measured at 30° C. and a relative humidity of 80%.

A fourteenth invention provides a laminate comprising a film as recited in any of the first through thirteenth inventions, and a substrate, with the film being provided on at least one surface of the substrate.

A fifteenth invention provides a laminate according to the fourteenth invention, which is employed for a gas-barrier material.

A sixteenth invention provides a laminate according to the fourteenth or fifteenth invention, which exhibits an oxygen permeation coefficient of 1,000 cm$^3$(STP)·μm/(m$^2$·day·MPa) or less as measured at 30° C. and a relative humidity of 80%.

A seventeenth invention provides a film (P) derived from a poly(carboxylic acid) polymer (A) and a polyvalent metal compound (B) serving as raw materials, wherein the peak ratio ($A_{1560}/A_{1700}$) in an infrared absorption spectrum of the film is less than 0.25.

An eighteenth invention provides a film (P-1) according to the seventeenth invention, which has at least one layer structure unit including a layer (a) formed of the poly(carboxylic acid) polymer (A) and a layer (b) formed of the polyvalent metal compound (B), with the layers (a) and (b) being adjacent to each other.

A nineteenth invention provides a film (P-1a) according to the eighteenth invention, which has at least one layer structure unit in which the layers (a) and (b) are adjacently arranged in the following order: layer (b)/layer (a)/layer (b) or layer (a)/layer (b)/layer (a).

A twentieth invention provides a film (P-1-1) according to the eighteenth invention, wherein the total amount (Bt) of the polyvalent metal compound (B) is at least 0.2 eq on the basis of the total amount (At) of carboxyl groups contained in all the layers (a) and (b) which are adjacent to each other.

A twenty-first invention provides a film (P-1a-1) according to the nineteenth invention, wherein the total amount (Bt) of the polyvalent metal compound (B) is at least 0.2 eq on the basis of the total amount (At) of carboxyl groups contained in all the layers (a) and (b) which are adjacent to each other.

A twenty-second invention provides a film (P-2) according to the seventeenth invention, which is formed from a mixture containing the poly(carboxylic acid) polymer (A) and the polyvalent metal compound (B).

A twenty-third invention provides a film (P-2-1) according to the twenty-second invention, wherein the amount of the polyvalent metal compound (B) is at least 0.2 eq on the basis of the amount of all the carboxyl groups contained in the poly(carboxylic acid) polymer (A).

A twenty-fourth invention provides a laminate comprising a film (P) as recited in the seventeenth invention, and a substrate, with the film (P) being provided on at least one surface of the substrate.

A twenty-fifth invention provides a method for producing a film (P) as recited in the seventeenth invention, which method comprises forming, on a support, a coating film by means of a coating method from a solution or dispersion containing the poly(carboxylic acid) polymer (A) and a solvent, and a solution or dispersion containing the polyvalent metal compound (B) and a solvent.

A twenty-sixth invention provides a method for producing a film (P-1) as recited in the eighteenth invention, which method comprises forming, on a support, the layer (a) and the layer (b) by means of a coating method from a solution or dispersion containing the poly(carboxylic acid) polymer (A) and a solvent, and a solution or dispersion containing the polyvalent metal compound (B) and a solvent.

A twenty-seventh invention provides a method for producing a film (P-1a) as recited in the nineteenth invention, which method comprises forming, on a support, the layer (a) and the layer (b) so as to be arranged in the following order: layer (b)/layer (a)/layer (b) or layer (a)/layer (b)/layer (a) by means of a coating method from a solution or dispersion containing the poly(carboxylic acid) polymer (A) and a solvent, and a solution or dispersion containing the polyvalent metal compound (B) and a solvent.

A twenty-eighth invention provides a method for producing a film (P-2) as recited in the twenty-second invention, which method comprises forming, on a support, a coating film by means of a coating method from a solution or dispersion of a mixture containing the poly(carboxylic acid) polymer (A), the polyvalent metal compound (B), a volatile base (C), and a solvent.

A twenty-ninth invention provides a method for producing a film (P-2) according to the twenty-eighth invention, wherein the amounts of the polyvalent metal compound (B) and the volatile base (C) are at least 0.2 eq and at least 1.0 eq, respectively, on the basis of the amount of all the carboxyl groups contained in the poly(carboxylic acid) polymer (A), to thereby produce a film (P-2-1) as recited in the twenty-third invention.

A thirtieth invention provides a method for producing a film as recited in the first invention, which method comprises allowing a film (P) as recited in the seventeenth invention to stand in an atmosphere having a relative humidity of at least 20%, to thereby increase the peak ratio ($A_{1560}/A_{1700}$) in an infrared absorption spectrum of the film to 0.25 or more.

A thirty-first invention provides a method for producing a film as recited in the second invention, which method comprises allowing a film (P-1) as recited in the eighteenth invention to stand in an atmosphere having a relative humidity of at least 20%, to thereby increase the peak ratio ($A_{1560}/A_{1700}$) in an infrared absorption spectrum of the film to 0.25 or more.

A thirty-second invention provides a method for producing a film as recited in the third invention, which method comprises allowing a film (P-1a) as recited in the nineteenth invention to stand in an atmosphere having a relative humidity of at least 20%, to thereby increase the peak ratio ($A_{1560}/A_{1700}$) in an infrared absorption spectrum of the film to 0.25 or more.

A thirty-third invention provides a method for producing a film as recited in the fifth invention, which method comprises allowing a film (P-2) as recited in the twenty-second invention to stand in an atmosphere having a relative humidity of at least 20%, to thereby increase the peak ratio ($A_{1560}/A_{1700}$) in an infrared absorption spectrum of the film to 0.25 or more.

A thirty-fourth invention provides a method for producing a laminate as recited in the fourteenth invention, which method comprises allowing a laminate as recited in the twenty-fourth invention to stand in an atmosphere having a relative humidity of at least 20%, to thereby increase the peak ratio ($A_{1560}/A_{1700}$) in an infrared absorption spectrum of the laminate to 0.25 or more.

A thirty-fifth invention provides a method for producing a film as recited in the second invention, which method comprises forming, on a support, a film by means of a coating method from a solution or dispersion containing the poly(carboxylic acid) polymer (A) and a solvent, and a solution or dispersion containing the polyvalent metal compound (B) and a solvent, the film having at least one layer structure unit including the layer (a) formed of the poly(carboxylic acid) polymer (A) and the layer (b) formed of the polyvalent metal compound (B), with the layers (a) and (b) being adjacent to each other; and allowing the thus-formed film to stand in an atmosphere having a relative humidity of at least 20%.

A thirty-sixth invention provides a method for producing a film as recited in the fifth invention, which method comprises forming, on a support, a coating film by means of a coating method from a solution or dispersion of a mixture containing the poly(carboxylic acid) polymer (A), the polyvalent metal compound (B), the volatile base (C), and a solvent; and allowing the thus-formed coating film to stand in an atmosphere having a relative humidity of at least 20%.

A thirty-seventh invention provides a bag, a sheet, or a container, which comprises a film as recited in any of the seventeenth through twenty-third inventions.

A thirty-eighth invention provides a packaging material for thermal sterilization, which comprises a film as recited in any of the seventeenth through twenty-third inventions.

A thirty-ninth invention provides a bag, a sheet, or a container, which comprises a laminate as recited in the twenty-fourth invention.

A fortieth invention provides a packaging material for thermal sterilization, which comprises a laminate as recited in the twenty-fourth invention.

A forty-first invention provides a bag, a sheet, or a container, which comprises a film as recited in any of the first through thirteenth inventions.

A forty-second invention provides a packaging material for thermal sterilization, which comprises a film as recited in any of the first through thirteenth inventions.

A forty-third invention provides a bag, a sheet, or a container, which comprises a laminate as recited in any of the fourteenth through sixteenth inventions.

A forty-fourth invention provides a packaging material for thermal sterilization, which comprises a laminate as recited in any of the fourteenth through sixteenth inventions.

BEST MODE FOR CARRYING OUT THE INVENTION

The present invention will next be described in detail.

A first invention group relates to a film comprising, as raw materials, a poly(carboxylic acid) polymer (A) and a polyvalent metal compound (B), wherein the peak ratio ($A_{1560}/A_{1700}$) in an infrared absorption spectrum of the film is at least 0.25; and to a laminate comprising the film and a substrate, with the film being provided on at least one surface of the substrate.

A second invention group relates to a film comprising, as raw materials, a poly(carboxylic acid) polymer (A) and a polyvalent metal compound (B), wherein the peak ratio ($A_{1560}/A_{1700}$) in an infrared absorption spectrum of the film is less than 0.25; to a laminate comprising the film and a substrate, with the film being provided on at least one surface of the substrate; to a method for producing the film; and to a method for producing the laminate.

A third invention group relates to a method for producing the film of the first invention group; and to a method for producing the laminate of the first invention group.

A fourth invention group relates to use of the film and laminate of the first invention group; and use of the film and laminate of the second invention group.

The first invention group (hereinafter may be referred to as "the present invention") will next be described.

As used herein, the expression "film comprising, as raw materials, a poly(carboxylic acid) polymer (A) and a polyvalent metal compound (B)" encompasses a film having a layer structure in which a layer (a) formed of the poly(carboxylic acid) polymer (A) and a layer (b) formed of the polyvalent metal compound (B) are laminated with each other; and a film formed from a mixture containing the poly(carboxylic acid) polymer (A) and the polyvalent metal compound (B). The film or laminate of the first invention group exhibits excellent gas (e.g., oxygen)-barrier properties even in a high-humidity atmosphere, has water resistance so that the appearance, shape, and gas-barrier properties are not impaired by neutral water, high-temperature water vapor, or hot water, and is easily dissolved in an acid and/or an alkali.

Raw materials constituting the film of the first invention group, characteristic features of the raw materials, and requirements of the raw materials are common in all the films and laminates according to the second through fourth invention groups described in this specification.

The poly(carboxylic acid) polymer (A) employed in the first invention group may be an existing poly(carboxylic acid) polymer. The term "existing poly(carboxylic acid) polymer" collectively refers to polymers containing in the molecule two or more carboxyl groups. Specific examples of the existing poly(carboxylic acid) polymer include homopolymers formed from an α,β-monoethylenic unsaturated carboxylic acid serving as a polymerizable monomer, copolymers formed from at least two types of α,β-monoethylenic unsaturated carboxylic acids serving as monomers, copolymers formed from an α,β-monoethylenic unsaturated carboxylic acid and an ethylenic unsaturated monomer, and acidic polysaccharides containing in the molecule a carboxyl group, such as alginic acid, carboxymethyl cellulose, and pectin. These poly(carboxylic acid) polymers (A) may be employed singly or in combination of two or more species.

Typical examples of the α,β-monoethylenic unsaturated carboxylic acid include acrylic acid, methacrylic acid, itaconic acid, maleic acid, fumaric acid, and crotonic acid. Typical examples of the ethylenic unsaturated monomer capable of being copolymerized with such an α,β-monoethylenic unsaturated carboxylic acid include ethylene, propylene, saturated carboxylic acid vinyl esters (e.g., vinyl acetate), alkyl acrylates, alkyl methacrylates, alkyl itaconates, acrylonitrile, vinyl chloride, vinylidene chloride, vinyl fluoride, vinylidene fluoride, and styrene. In the case where the poly(carboxylic acid) polymer (A) is a copolymer formed from an α,β-monoethylenic unsaturated carboxylic acid and a saturated carboxylic acid vinyl ester (e.g., vinyl acetate), the copolymer may be subjected to saponification to thereby convert the saturated carboxylic acid vinyl ester moiety into vinyl alcohol.

In the case where the poly(carboxylic acid) polymer (A) employed in the first invention group is a copolymer formed from an α,β-monoethylenic unsaturated carboxylic acid and an ethylenic unsaturated monomer, from the viewpoints of the gas-barrier properties, high-temperature water vapor resistance, and hot water resistance of the resultant film, the compositional proportion of the α,β-monoethylenic unsaturated carboxylic acid in the copolymer is preferably 60 mol % or more, more preferably 80 mol % or more, much more preferably 90 mol % or more, most preferably 100 mol % (i.e., the poly(carboxylic acid) polymer (A) is a polymer formed solely from the α,β-monoethylenic unsaturated carboxylic acid). In the case where the poly(carboxylic acid) polymer (A) is a polymer formed solely from the α,β-monoethylenic unsaturated carboxylic acid, specific examples of the polymer include polymers formed through polymerization of at least one polymerizable monomer selected from the group consisting of acrylic acid, methacrylic acid, itaconic acid, maleic acid, fumaric acid, and crotonic acid; and mixtures of such polymers. Preferably, there are employed polymers or copolymers formed through polymerization of at least one polymerizable monomer selected from among acrylic acid, methacrylic acid, and maleic acid, and/or mixtures of such polymers or copolymers. More preferably, there are employed polyacrylic acid, polymethacrylic acid, polymaleic acid, and mixtures thereof. In the case where the poly(carboxylic acid) polymer (A) is a substance other than a polymer formed from an α,β-monoethylenic unsaturated carboxylic acid monomer; for example, an acidic polysaccharide, alginic acid is preferably employed.

No particular limitations are imposed on the number average molecular weight of the poly(carboxylic acid) polymer (A), but, from the viewpoint of film formability, the number average molecular weight is preferably 2,000 to 10,000,000, more preferably 5,000 to 1,000,000.

The poly(carboxylic acid) polymer (A) may be mixed with a polymer other than the polymer (A) to form the film of the first invention group, so long as the gas-barrier properties, high-temperature water vapor resistance, and hot water resistance of the film are not impaired. However, preferably, the film is formed solely from the poly(carboxylic acid) polymer (A).

From the viewpoints of the gas-barrier properties, high-temperature water vapor resistance, and hot water resistance of the film of the first invention group, a film formed solely from the poly(carboxylic acid) polymer (A) (which is a raw material of the film of the first invention group) preferably exhibits an oxygen permeation coefficient as measured under dry conditions (30° C., relative humidity: 0%) of 1,000 $cm^3$ (STP)·μm/($m^2$·day·MPa) or less, more preferably 500 $cm^3$ (STP)·μm/($m^2$·day·MPa) or less, most preferably 100 $cm^3$ (STP)·μm/($m^2$·day·MPa) or less.

As used herein, "oxygen permeation coefficient" can be obtained through, for example, the following procedure.

Firstly, the poly(carboxylic acid) polymer (A) is dissolved in water, to thereby prepare a 10 wt. % aqueous solution.

Subsequently, the thus-prepared solution is applied onto a plastic substrate by use of a bar coater, followed by drying, to thereby prepare a coating film (thickness: 1 µm) formed of a poly(carboxylic acid) polymer layer. The oxygen permeability of the thus-prepared coating film is measured under dry conditions (30° C., relative humidity: 0%). As the plastic substrate, an arbitrary plastic film having a known oxygen permeability is employed. If the oxygen permeability of the coating film formed from the poly(carboxylic acid) polymer (A) is 1/10 or less that of the plastic film serving as the substrate, the thus-measured oxygen permeability value of the coating film can be substantially regarded as the oxygen permeability of the layer of the poly(carboxylic acid) polymer (A).

When the thus-measured oxygen permeability of the poly(carboxylic acid) polymer (A) layer having a thickness of 1 µm is multiplied by the thickness (1 µm), the oxygen permeability can be converted into the oxygen permeation coefficient. The oxygen permeability can be measured by use of, for example, an oxygen permeability measuring apparatus (OX-TRAN™ 2/20, product of Modern Control). The oxygen permeability is measured by means of JIS K-7126, B method (equal-pressure method) and the method specified by ASTM D3985-81, and the thus-measured value is represented by a unit of $cm^3(STP)/(m^2 \cdot day \cdot MPa)$. As used herein, "(STP)" refers to standard conditions (0° C., 1 atm) for specifying the volume of oxygen.

The polyvalent metal compound (B) employed in the first invention group encompasses a polyvalent metal element having a valence of 2 or more, and a compound of such a polyvalent metal element. Specific examples of the polyvalent metal include alkaline earth metals such as beryllium, magnesium, and calcium; transition metals such as titanium, zirconium, chromium, manganese, iron, cobalt, nickel, copper, and zinc; and aluminum. Specific examples of the polyvalent metal compound include oxides, hydroxides, carbonates, organic acid salts, and inorganic acid salts of the aforementioned polyvalent metals; ammonium complexes of the polyvalent metals; secondary to quaternary amine complexes of the polyvalent metals; and carbonates and organic acid salts of such complexes. Examples of the organic acid salts include acetates, oxalates, citrates, lactates, phosphates, phosphites, hypophosphites, stearates, and monoethylenic unsaturated carboxylic acid salts. Examples of the inorganic acid salts include chlorides, sulfates, and nitrates. Other examples of the polyvalent metal compound include alkyl alkoxides of the aforementioned polyvalent metals.

These polyvalent metal compounds may be employed singly or in combination of two or more species. Of these polyvalent metal compounds, the polyvalent metal compound (B) employed in the first invention group is preferably a divalent metal compound, from the viewpoints of the gas-barrier properties, high-temperature water vapor resistance, hot water resistance, and productivity of the film of the first invention group. More preferably, the polyvalent metal compound (B) is an oxide, hydroxide, or carbonate of an alkaline earth metal, cobalt, nickel, copper, or zinc; an ammonium complex of cobalt, nickel, copper, or zinc; or a carbonate of such a complex. Most preferably, the polyvalent metal compound (B) is an oxide, hydroxide, or carbonate of magnesium, calcium, copper, or zinc; an ammonium complex of copper or zinc; or a carbonate of such a complex.

A monovalent metal compound (e.g., a monovalent metal salt of a poly(carboxylic acid) polymer) may be mixed with or contained in the film of the first invention group, so long as the gas-barrier properties, high-temperature water vapor resistance, and hot water resistance of the film are not impaired. The monovalent metal compound to be added is preferably 0.2 eq or less on the basis of the total amount of carboxyl groups contained in the poly(carboxylic acid) polymer (A), from the viewpoints of the gas-barrier properties, high-temperature water vapor resistance, and hot water resistance of the film of the first invention group. The monovalent metal compound may be partially contained in the molecule of a polyvalent metal salt of the poly(carboxylic acid) polymer.

No particular limitations are imposed on the form of the polyvalent metal compound (B). As described below, in the film of the first invention group, a portion or the entirety of the polyvalent metal compound (B) and carboxyl groups of the poly(carboxylic acid) polymer (A) together form a salt. Therefore, in the case where the film of the first invention group contains the polyvalent metal compound (B) that does not participate in formation of a carboxylic acid salt, or in the case where the film is formed of a layer structure unit in which the layer (a) formed of the poly(carboxylic acid) polymer (A) and the layer (b) formed of the polyvalent metal compound (B) are adjacent to each other, preferably, the polyvalent metal compound (B) is in the form of particles having a small particle size, from the viewpoint of transparency of the film. Furthermore, from the viewpoint that the below-described coating mixture for forming the film of the first invention group is more uniformly prepared in an efficient manner, preferably, the polyvalent metal compound is in the form of particles having a small particle size. The average particle size of the polyvalent metal compound is preferably 5 µm or less, more preferably 1 µm or less, most preferably 0.1 µm or less.

In the case where the film of the first invention group has at least one layer structure unit in which the layer (a) formed of the poly(carboxylic acid) polymer (A) and the layer (b) formed of the polyvalent metal compound (B) are adjacent to each other, from the viewpoints of the gas-barrier properties, high-temperature water vapor resistance, and hot water resistance of the film, preferably, the total amount (Bt) of the polyvalent metal compound (B) is 0.2 eq or more on the basis of the total amount (At) of carboxyl groups contained in all the layers (a) and (b) which are adjacent to each other; i.e., the chemical equivalent of the total amount (Bt) of the polyvalent metal compound (B) is 0.2 or more on the basis of the total amount (At) of carboxyl groups contained in these layers. In the case where the film of the first invention group is formed from a mixture containing the poly(carboxylic acid) polymer (A) and the polyvalent metal compound (B), preferably, the amount of the polyvalent metal compound (B) is 0.2 eq or more on the basis of the amount of all the carboxyl groups contained in the poly(carboxylic acid) polymer (A). In any of the above cases, the amount of the polyvalent metal compound (B) is more preferably 0.5 eq or more. From the viewpoints of formability and transparency of the film in addition to the aforementioned viewpoints, the amount of the polyvalent metal compound (B) is much more preferably 0.8 eq or more and 10 eq or less, most preferably 1 eq or more and 5 eq or less.

In the present specification, the expression "the total amount of carboxyl groups" is employed in the case where the film has a layer structure in which the layer (a) and the layer (b) are adjacent to each other, whereas the expression "all the carboxyl groups" is employed in the case where the film is formed from a mixture containing the poly(carboxylic acid) polymer (A) and the polyvalent metal compound (B). In these expressions, the term "carboxyl groups" includes carboxyl groups of the polycarboxylic acid that do not participate in reaction between the poly(carboxylic acid) polymer and the polyvalent metal compound, and carboxyl groups that participate in reaction between the poly(carboxylic acid) polymer and the polyvalent metal compound for formation of a polycarboxylic acid polyvalent metal salt (described below). The thus-formed polycarboxylic acid salt can be identified through measurement of an infrared absorption spectrum of the film including the layer (a) and the layer (b) which are adjacent to each other. Similar to the case of the film including the layers (a) and (b), in the case of the film formed from a mixture containing the poly(carboxylic acid) polymer (A) and the polyvalent metal compound (B), the term "carboxyl groups" employed in the expression "all the carboxylic groups" includes carboxyl groups of the polycarboxylic acid that do not participate in reaction between the poly(carboxylic acid) polymer and the polyvalent metal compound, and carboxyl groups that participate in reaction between the poly (carboxylic acid) polymer and the polyvalent metal compound for formation of a polycarboxylic acid polyvalent metal salt. Formation of the polycarboxylic acid salt can be confirmed through measurement of an infrared absorption spectrum of the film.

The aforementioned chemical equivalent(s) can be determined through, for example, the following procedure. Determination of the chemical equivalent(s) will now be described by taking, as an example, the case where the poly(carboxylic acid) polymer (A) is polyacrylic acid and the polyvalent metal compound (B) is magnesium oxide. When the mass of polyacrylic acid is taken as 100 g, the amount of carboxyl groups contained in 100 g of polyacrylic acid is 1.39 mol, since the molecular weight of a monomer unit of polyacrylic acid is 72 and the monomer unit contains one carboxyl group. In this case, the amount of a base required for neutralizing 1.39 mol of carboxyl groups is defined as 1 eq on the basis of 100 g of polyacrylic acid. Therefore, when 0.2 eq of magnesium oxide is to be mixed with 100 g of polyacrylic acid, magnesium oxide is added in an amount required for neutralizing 0.278 mol of carboxyl groups. Since magnesium has a valence of 2, and magnesium oxide has a molecular weight of 40, the amount of magnesium oxide corresponding to 0.2 eq on the basis of 100 g of polyacrylic acid is 5.6 g (0.139 mol).

The peak ratio ($A_{1560}/A_{1700}$) in an infrared absorption spectrum of the film of the first invention group is 0.25 or more. As used herein, the peak ratio ($A_{1560}/A_{1700}$) in the infrared absorption spectrum of the film corresponds to the peak height ratio ($A_{1560}/A_{1700}$). Therefore, the peak height ratio will now be described.

$A_{1560}$ represents the height of an absorption peak at 1,560 cm$^{-1}$ of the infrared absorption spectrum of the film, the peak attributed to the stretching vibration of C=O belonging to a salt-form carboxylate group (—COO$^-$). In general, the stretching vibration of C=O belonging to a salt-form carboxylate group (—COO$^-$) is identified by a maximum absorption peak around 1,560 cm$^{-1}$ within an infrared wave number range of 1,600 cm$^{-1}$ to 1,500 cm$^{-1}$.

$A_{1700}$ represents the height of an absorption peak at 1,700 cm$^{-1}$ of the infrared absorption spectrum of the film, the peak attributed to the stretching vibration of C=O belonging to a carboxyl group (—COOH), and the infrared absorption peak corresponding to $A_{1700}$ is separated from that corresponding to $A_{1560}$. In general, the stretching vibration of C=O belonging to a carboxyl group (—COOH) is identified by a maximum absorption peak around 1,700 cm$^{-1}$ within an infrared wave number range of 1,800 cm$^{-1}$ to 1,600 cm$^{-1}$. The absorbance of the film is proportional to the amount of infrared active chemical species present in the film. Therefore, the peak ratio ($A_{1560}/A_{1700}$) in the infrared absorption spectrum of the film can be used as an index showing the ratio of the amount of salt-form carboxylate groups (—COO$^-$) contained in the above-formed polycarboxylic acid polyvalent metal salt to that of free carboxyl groups (—COOH) contained in the film.

When the poly(carboxylic acid) polymer (A) employed in the present invention is a copolymer formed from an α,β-monoethylenic unsaturated carboxylic acid and an unsaturated carboxylic acid ester (e.g., an alkyl acrylate or an alkyl methacrylate), as in the case of a carboxyl group, the stretching vibration of C=O belonging to an ester-form carboxylate group (—COO—R: R represents an alkyl group) of the ester is identified by a maximum absorption peak around 1,730 cm$^{-1}$ within an infrared wave number range of 1,800 cm$^{-1}$ to 1,600 cm$^{-1}$. Therefore, an infrared absorption spectrum of the copolymer includes a peak attributed to the stretching vibration of C=O belonging to a carboxyl group of the carboxylic acid, and a peak attributed to the stretching vibration of C=O belonging to an ester-form carboxylate group of the ester. Even in such a case, the effect of the absorption peak attributed to the ester-form carboxylate group can be eliminated by using the peak height ratio ($A_{1560}/A_{1700}$).

In the case where the film of the first invention group is mixed with a monovalent metal compound to the extent that the gas-barrier properties, high-temperature water vapor resistance, and hot water resistance of the film are not impaired, the stretching vibration of C=O belonging to a salt-form carboxylate group (—COO$^-$) of a carboxylic acid monovalent metal salt is identified by a maximum absorption peak around 1,560 cm$^{-1}$ within an infrared wave number range of 1,600 cm$^{-1}$ to 1,500 cm$^{-1}$. Therefore, in this case, an infrared absorption spectrum of the film includes two types of peaks attributed to the stretching vibration of C=O belonging to the carboxylic acid monovalent metal salt and the stretching vibration of C=O belonging to the carboxylic acid polyvalent metal salt. Even in such a case, as described above, the peak ratio ($A_{1560}/A_{1700}$) is used as an index showing the ratio of the amount of salt-form carboxylate groups (—COO$^-$) contained in the carboxylic acid polyvalent metal salt to that of free carboxyl groups (—COOH).

The peak ratio ($A_{1560}/A_{1700}$) in an infrared absorption spectrum of the film of the first invention group is 0.25 or more. From the viewpoints of the gas-barrier properties, high-temperature water vapor resistance, and hot water resistance of the film, the peak ratio is preferably 1.0 or more, more preferably 4.0 or more.

The ionization degree defined by the following formula (1) can be calculated on the basis of the peak ratio ($A_{1560}/A_{1700}$) of the infrared absorption spectrum. The ionization degree refers to the ratio of the amount of the salt-form carboxylate groups to the amount of all the free carboxyl groups and salt-form carboxylate groups contained in the poly(carboxylic acid) polymer (A). The ionization degree indicates the amount ratio of chemical species more accurately than the peak ratio ($A_{1560}/A_{1700}$) does.

$$\text{(Ionization degree)} = Y/X \tag{1}$$

In formula (1), X represents the amount by mol of all the carbonyl carbon atoms (belonging to the free carboxyl groups and salt-form carboxylate groups) contained in the poly(carboxylic acid) polymer in 1 g of the film; and Y represents the amount by mol of carbonyl carbon atoms belonging to the salt-form carboxylate groups contained in the poly(carboxylic acid) polymer in 1 g of the film.

The ionization degree of the film of the first invention group is preferably 0.2 or more. The maximum value of the ionization degree is 1 according to its definition.

The ionization degree is more preferably 0.5 or more, much more preferably 0.8 or more, from the viewpoints of the gas-barrier properties, high-temperature water vapor resistance, and hot water resistance of the film of the first invention group.

As described below, the ionization degree is obtained by determining the peak ratio ($A_{1560}/A_{1700}$) of an infrared absorption spectrum of the film. The infrared absorption spectrum can be measured by use of, for example, FT-IR 2000 (product of PERKIN-ELMER).

Specifically, an infrared absorption spectrum of the film is measured by means of, for example, the transmission method, the ATR (attenuated total reflectance) method, the KBr pellet method, the diffuse reflectance method, or photoacoustic spectrometry (PAS); the heights or areas of peaks attributed to the aforementioned free carboxyl group and salt-form carboxylate group (at the respective maximum absorption wave numbers) in the absorption spectrum are measured; and the ratio between the peak heights or peak areas is obtained. Preferably, the infrared absorption spectrum is measured by means of the transmission method or the ATR method, from the viewpoint of convenience.

The ionization degree of the film can be calculated by correlating with the aforementioned peak ratio; specifically, by use of a calibration curve which has been prepared in advance.

The calibration curve employed for calculation of the ionization degree is prepared through the following procedure. Firstly, a poly(carboxylic acid) polymer is neutralized with a known amount of sodium hydroxide, and the thus-neutralized polymer is applied onto, for example, a substrate, to thereby prepare a coating film serving as a standard sample. When an infrared absorption spectrum of the thus-prepared standard sample is measured, there are separately detected absorption peaks attributed to the stretching vibration of the carbonyl group (C=O) belonging to a carboxyl group (—COOH) contained in the sample and the stretching vibration of the carbonyl group (C=O) belonging to a salt-form carboxylate group (—COO$^-$Na$^+$) contained in the sample. Subsequently, there is obtained the ratio between the intensities of these absorption peaks at the wave numbers where the respective peaks become maximum; i.e., the peak height ratio. Since the poly(carboxylic acid) polymer is neutralized with a known amount of sodium hydroxide, the mol ratio (amount ratio) of salt-form carboxylate groups (—COO$^-$Na$^+$) contained in the polymer to carboxyl groups (—COOH) contained in the polymer is known. Therefore, the calibration curve can be prepared through the following procedure: firstly, several different standard samples containing sodium hydroxide in different amounts are prepared, and infrared absorption spectra of the samples are measured; and subsequently, the relation between the aforementioned intensity ratio and known mol ratio is determined by means of regression analysis. By use of the thus-prepared calibration curve, the mol ratio of salt-form carboxylate groups (—COO$^-$) contained in an unknown sample (with respect to ionization degree) to carboxyl groups (—COOH) contained in the sample is determined on the basis of the results of measurement of an infrared absorption spectrum of the sample. By use of the results, there can be obtained the ratio of the amount of carbonyl carbon atoms belonging to the salt-form carboxylate groups to the amount of all the carbonyl carbon atoms belonging to the carboxyl groups and salt-form carboxylate groups; i.e., the ionization degree. The infrared absorption spectrum profile is determined in accordance with the chemical structure of a carboxyl group of the polymer, and is virtually not affected by a salt-forming metal species.

In order to obtain the peak ratio, typically, an infrared absorption spectrum is measured as follows. In the case of a film formed on a support through which light does not penetrate, an infrared absorption spectrum of the film is measured after the film is removed from the support. In the case of a laminate formed of a film together with a substrate, when the substrate is formed of a material which does not exhibit an absorption peak at around 1,560 cm$^{-1}$ nor around 1,700 cm$^{-1}$, an infrared absorption spectrum of the laminate is measured, whereas when the substrate exhibits an absorption peak at around 1,560 cm$^{-1}$ or around 1,700 cm$^{-1}$, an infrared absorption spectrum of the film is measured after the film is removed from the substrate. In the case of a laminate formed of layer (b)/layer (a)/layer (b) or formed of layer (a)/layer (b), an infrared absorption spectrum of the laminate is measured, and the peak ratio is obtained on the basis of the thus-measured spectrum of the film. When the ATR method or the ATR crystal method is employed, an infrared absorption spectrum is measured by use of KRS-5 (thallium bromide-iodide) under the following conditions: incident angle: 45°, resolution: 4 cm$^{-1}$, integration: 30 times. Measurement of an infrared absorption spectrum by use of FT-IR is described in, for example, "*FT-IR no Kiso to Jissai*" edited by Mitsuo Tasumi.

The oxygen permeability (30° C., relative humidity: 80%) of the film of the first invention group is used as an index for showing the gas-barrier properties of the film. Meanwhile, the oxygen permeation coefficient as measured under dry conditions (30° C., relative humidity: 0%) is used as an index for showing a characteristic feature of the poly(carboxylic acid) polymer (A) employed in the first invention group. Next will be described the difference between "oxygen permeability" and "oxygen permeation coefficient," which are used for different purposes.

Since the film of the first invention group exhibits excellent gas-barrier properties even under high-humidity conditions, the oxygen permeability of the film under high-humidity conditions is employed as an index for showing the gas-barrier properties of the film. Unless otherwise specified, the oxygen permeability is measured under the following conditions: temperature: 30° C., relative humidity: 80%.

The present inventors have found that when the poly(carboxylic acid) polymer (A) employed in the first invention group satisfies a specific requirement, the resultant film exhibits excellent gas (e.g., oxygen)-barrier properties even at high humidity and excellent resistance to neutral water, high-temperature water vapor, or hot water, and is easily dissolved in an acid and/or an alkali.

The requirement is that the oxygen permeation coefficient of a film formed solely from the poly(carboxylic acid) polymer (A), as measured under dry conditions (temperature: 30° C., relative humidity: 0%), is a specific value or less. As used herein, "oxygen permeation coefficient" is obtained by multiplying the measured oxygen permeability of the film by the thickness of the film, and represents gas-barrier properties intrinsic to the poly(carboxylic acid) polymer (A) (irrespective of the film thickness).

The oxygen permeability of the film formed solely from the poly(carboxylic acid) polymer (A) is measured under dry conditions, since the oxygen permeability of the film varies depending on the relative humidity (Japanese Patent Application Laid-Open (kokai) No. 06-220221). As used herein, the expression "measured under dry conditions" refers to the case where a sample is subjected to measurement at a relative humidity of 0%. Thus, the oxygen permeation coefficient intrinsic to the poly(carboxylic acid) polymer (A) employed in the first invention group can be obtained. In general, the gas permeation coefficient of a polymer is affected by, for example, the molecular structure and physical states of the polymer, the type of a gas, and the measurement atmosphere.

Therefore, when limitations are imposed on the type of a gas, the measurement atmosphere, and the method for preparing a film from the polymer, the gas permeation coefficient can be employed as a parameter for determining the structure of the polymer.

The relation between the molecular structure and gas permeation coefficient of a polymer is described in Encyclopedia of Polymer Science and Engineering, Vol. 2, p. 177 (1985), John Wiley & Sons, Inc.

The film of the first invention group is insoluble in neutral water, but is easily dissolved in an acid and/or an alkali. Therefore, when, for example, a laminate including the film of the first invention group and a support on which the film is provided is disposed of, the film can be readily separated and recovered from the support, and, in addition, the film can be recycled. In the case of a layered film including the film of the first invention group so that it is not exposed to the outside, when the layered film is treated with an acid or an alkali under specific conditions, layers constituting the layered film can be exfoliated and separated at a portion of the layered film in which the film of the first invention group is present.

As used herein, "solubility in an acid and/or an alkali" can be evaluated by means of JIS K7114 (test method for chemical resistance of plastic).

In the first invention group, in accordance with the form of the film of the first invention group, the solubility of the film in an acid and/or an alkali is evaluated by means of a treatment of the method specified by JIS K7114.

Next will be described the method employed in the first invention group for evaluating the solubility of the film in an acid and/or an alkali. A laminate including the film of the first invention group and a substrate (which is insoluble in an acid and an alkali) on which the film is provided is employed as a sample for evaluation. A piece (10 cm×10 cm) is cut out of the sample, and the sample piece is immersed in a test solution (500 ml) for solubility evaluation at room temperature for 24 hours. The test solution to be employed is 1 N aqueous hydrochloric acid solution (acidic test solution), 1 N aqueous sodium hydroxide solution (alkaline test solution), or distilled water (neutral test solution). Before and after immersion of the sample piece in the test solution, the surface of the sample piece to which the film of the first invention group is exposed is washed with distilled water and dried, and then an infrared absorption spectrum of the sample piece is measured by means of the ATR method. That is, the infrared absorption spectrum is measured by means of the method employed for determining the aforementioned peak ratio ($A_{1560}/A_{1700}$).

Since the film of the first invention group contains carboxyl groups and salt-form carboxylate groups, the presence of the film on the substrate can be confirmed through measurement of the infrared absorption spectrum by means of the ATR method. Firstly, infrared absorption spectra of the surface of the sample piece are measured before and after the sample piece is immersed in the test solution, and the presence or absence of the film on the substrate is confirmed through comparison between the thus-measured spectra. Subsequently, whether or not the film is released in the test solution, which release could occur through, for example, exfoliation of the film from the substrate, is confirmed through visual observation. Only in the case where the absence of the film on the substrate surface is confirmed by the infrared absorption spectrum after the sample piece is immersed in the test solution, and release of the film in the test solution is not confirmed through visual observation, the film is evaluated as being "soluble"; i.e., the film is evaluated as exhibiting solubility in an acid and/or an alkali. In other cases, the film is evaluated as being "insoluble."

The film of the first invention group exhibits excellent gas (e.g., oxygen)-barrier properties even at high humidity. The oxygen permeation coefficient of the film of the first invention group as measured at 30° C. and a relative humidity of 80% is preferably equal to or lower than the oxygen permeation coefficient of the poly(carboxylic acid) polymer (A) constituting the film as measured under dry conditions (30° C., relative humidity: 0%). Specifically, the oxygen permeation coefficient of the film of the first invention group as measured at 30° C. and a relative humidity of 80% is preferably 1,000 $cm^3(STP)·\mu m/(m^2·day·MPa)$ or less, more preferably 500 $cm^3(STP)·\mu m/(m^2·day·MPa)$ or less, much more preferably 100 $cm^3(STP)·\mu m/(m^2·day·MPa)$ or less. A film having an oxygen permeation coefficient falling within the above range is suitable for producing a gas-barrier material.

No particular limitations are imposed on the thickness of the film of the first invention group, but, from the viewpoints of formability and handling of the film, the thickness is preferably 0.001 µm to 1 mm, more preferably 0.01 µm to 100 µm, most preferably 0.1 µm to 10 µm.

Next will be described the laminate of the first invention group comprising the film and a support (or a substrate), with the film being provided on at least one surface of the support. When a support employed during production of the film of the first invention group is combined with the film, and the support is incorporated into the laminate, the support may be called a "substrate." The laminate of the first invention group contemplates, for example, securing formability to form a thin film properly, supporting the thinly formed film of the first invention group, and imparting gas-barrier properties to the substrate. No particular limitations are imposed on the material of the support, and the material may be, for example, metal, glass, paper, or plastic. A metallic or glass material through which gas does not permeate may be employed as the support, for the purpose of imparting gas-barrier properties to a defective portion of the material. No particular limitations are imposed on the form of the support, and examples of the form include a film, a sheet, and a container such as a bottle, a cup, or a tray.

In the case where the support is formed of a plastic material, no particular limitations are imposed on the type of the material. Specific examples of the plastic material to be employed include polyolefin polymers such as low-density polyethylene, high-density polyethylene, linear low-density polyethylene, polypropylene, poly(4-methylpentene), and cyclic polyolefins, copolymers thereof, and acid-modified products thereof; vinyl-acetate-containing copolymers such as polyvinyl acetate, ethylene-vinyl acetate copolymers, saponified ethylene-vinyl acetate copolymers, and polyvinyl alcohol; aromatic polyester polymers such as polyethylene terephthalate, polybutylene terephthalate, and polyethylene naphthalate, and copolymers thereof; aliphatic polyester polymers such as poly(ε-caprolactone), polyhydroxybutyrate, and polyhydroxyvalerate, and copolymers thereof; polyamide polymers and copolymers thereof, such as nylon 6, nylon 66, nylon 12, nylon 6/66 copolymers, nylon 6/12 copolymers, and m-xylene adipamide-nylon 6 copolymers; polyether polymers such as polyethylene glycol, polyethersulfone, polyphenylene sulfide, and polyphenylene oxide; chlorine-containing polymers and fluorine-containing polymers, such as polyvinyl chloride, polyvinylidene chloride, polyvinyl fluoride, and polyvinylidene fluoride, and copolymers thereof; acrylic polymers such as polymethyl acrylate, polyethyl acrylate, polymethyl methacrylate, polyethyl methacrylate, and polyacrylonitrile, and copolymers thereof; polyimide polymers and copolymers thereof; resins employed for coating materials, such as alkyd resin, melamine resin, acrylic resin, nitrocellulose, urethane resin, unsaturated polyester resin, phenolic resin, amino resin, fluorocarbon resin, and epoxy resin; and natural polymer compounds such as cellulose, starch, pullulan, chitin, chitosan, glucomannan, agarose, and gelatin. The support may be, for example, an unstretched sheet, a stretched sheet, an unstretched film, a stretched film, or a container such as a bottle, a cup, a tray, or a bag, which is formed of the aforementioned plastic material.

Alternatively, the support may be a product produced by forming, on the surface of, for example, a sheet, film, or container formed of the aforementioned plastic material, a thin film formed of an inorganic compound or a metallic compound, such as silicon oxide, aluminum oxide, aluminum, or silicon nitride, by means of vapor deposition, sputtering, or ion plating. In general, such a thin film formed of an inorganic compound or a metallic compound is employed for the purpose of imparting gas-barrier properties to the support. However, the support may be adversely affected by the environment in which it is used; for example, the support may be adversely affected by high-temperature water vapor or hot water, and pinholes or cracks may be generated in the thin film, leading to deterioration of gas-barrier properties. Therefore, the film of the first invention group is laminated on the support (substrate), and the resultant laminate is employed for a gas-barrier material.

The peak ratio ($A_{1560}/A_{1700}$) is 0.25 or more in an infrared absorption spectrum of the following film: the film of the first invention group having at least one layer structure unit in which the layer (a) formed of the poly(carboxylic acid) polymer (A) and the layer (b) formed of the polyvalent metal compound (B) are adjacent to each other; an embodiment of the film of the first invention group; i.e., a film having at least one layer structure unit in which the layer (a) and the layer (b) are adjacently arranged in the following order: layer (b)/layer (a)/layer (b) or layer (a)/layer (b)/layer (a); or a film formed from a mixture containing the poly(carboxylic acid) polymer (A) and the polyvalent metal compound (B).

For example, when a film having at least one layer unit in which the layer (a) formed of the poly(carboxylic acid) polymer (A) and the layer (b) formed of the polyvalent metal compound (B) are adjacent to each other is formed on a support, and the resultant laminate is subjected to treatment under predetermined conditions, the peak ratio ($A_{1560}/A_{1700}$) is 0.25 or more in an infrared absorption spectrum of the film removed from the support.

As used herein, the expression "the peak ratio ($A_{1560}/A_{1700}$) is 0.25 or more in an infrared absorption spectrum of the film" refers to that even when the film has a plurality of layer units, each including the layer (a)/the layer (b), or even when the film is formed of one or more layers, each being formed from a mixture containing the poly(carboxylic acid) polymer (A) and the polyvalent metal compound (B), the peak ratio ($A_{1560}/A_{1700}$) is 0.25 or more in an infrared absorption spectrum of the film.

When the peak ratio ($A_{1560}/A_{1700}$) is 0.25 or more in an infrared absorption spectrum of the film, specific amounts or more of carboxyl groups contained in the poly(carboxylic acid) polymer (A) constituting the film are formed into carboxylic acid polyvalent metal salt moieties.

The first invention group also provides a laminate comprising a support serving as a substrate; and a film including at least one layer structure unit formed of layer (a)/layer (b) or formed of layer (b)/layer (a)/layer (b), or a film formed from a mixture containing the poly(carboxylic acid) polymer (A) and the polyvalent metal compound (B), the film being provided on at least one surface of the substrate. In the case where the peak ratio ($A_{1560}/A_{1700}$) of an infrared absorption spectrum of the laminate is to be determined, when the substrate exhibits an absorption peak at a wave number of around 1,560 $cm^{-1}$ or around 1,700 $cm^{-1}$, the film is separated from the substrate, and the film is subjected to measurement of an infrared absorption spectrum, since the substrate impedes determination of the peak ratio, whereas when the substrate does not exhibit an absorption peak at a wave number of around 1,560 $cm^{-1}$ nor around 1,700 $cm^{-1}$, the laminate including the substrate and the film is subjected to measurement of an infrared absorption spectrum. The aforementioned explanations can be applied to the quantitative relation between the poly(carboxylic acid) polymer (A) and the polyvalent metal compound (B) employed in the laminate of the first invention group.

(Second Invention Group)

Next will be described the second invention group, which relates to a film formed from the same raw materials as those employed in the film or laminate of the first invention group, wherein the peak ratio ($A_{1560}/A_{1700}$) in an absorption spectrum of the film is less than 0.25, to a laminate comprising the film, to a method for producing the film, and to a method for producing the laminate. The film or laminate of the second invention group (hereinafter may be referred to as "the present invention") is a precursor of the film or laminate of the first invention group. The film of the second invention group contains a polycarboxylic acid salt formed from the poly(carboxylic acid) polymer (A) and the polyvalent metal compound (B), and the amount of the salt contained in the film of the second invention group is smaller than that contained in the film of the first invention group.

Preferred conditions for, for example, the poly(carboxylic acid) polymer (A) and the polyvalent metal compound (B) constituting the film (P-1) of the second invention group (i.e., the film comprising at least one layer structure unit including the layer (a) formed of the poly(carboxylic acid) polymer (A) and the layer (b) formed of the polyvalent metal compound (B), the layers (a) and (b) being adjacent to each other, wherein the peak ratio ($A_{1560}/A_{1700}$) in an infrared absorption spectrum of the film is less than 0.25), and compositional proportions of the polymer (A) and the compound (B) are similar to those described above in the case of the film of the first invention group.

Specific examples of the layer structure of the film (P-1) include layer (a)/layer (b), the substrate/layer (a)/layer (b), and the substrate/layer (b)/layer (a). Embodiments of the film (P-1) include a film (P-1a) having at least one layer structure unit in which the layers (a) and (b) are adjacently arranged in the following order: layer (b)/layer (a)/layer (b) or layer (a)/layer (b)/layer (a); a film (P-1-1) in which the total amount (Bt) of the polyvalent metal compound (B) is 0.2 eq or more on the basis of the total amount (At) of carboxyl groups contained in all the adjacently arranged layers (a) and (b) of the film (P-1); and a film (P-1a-1) in which the total amount (Bt) of the polyvalent metal compound (B) is 0.2 eq or more on the basis of the total amount (At) of carboxyl groups contained in all the adjacently arranged layers (a) and (b) of the film (P-1a); and a film (P-2) formed from a mixture containing the poly(carboxylic acid) polymer (A) and the polyvalent metal compound (B); and a film (P-2-1) in which the amount of the polyvalent metal compound (B) contained in the film (P-2) is 0.2 eq or more on the basis of the amount of all the carboxyl groups in the poly(carboxylic acid) polymer (A) contained in the film (P-2); and a film (P) of the second invention group provides a laminate comprising any of the aforementioned films formed of a poly(carboxylic acid) polymer (A) and a polyvalent metal compound (B), as raw materials, and a substrate, with the film being provided at least one surface of the substrate. The specific structure of the substrate (support) constituting the laminate is similar to that of the support employed in the above-described first invention group. In the case where at least one layer structure unit including the adjacently arranged layers (a) and (b) is provided on a support, to thereby form a laminate, the support may be called a "substrate." The peak ratio $(A_{1560}/A_{1700})$ in an infrared absorption spectrum of any of the aforementioned films is less than 0.25.

In any of the aforementioned films, the amount of the salt formed of the poly(carboxylic acid) polymer and the polyvalent metal compound is small. When the film is allowed to stand in a natural environment, or when the film is subjected to drying during production of the film, the peak ratio $(A_{1560}/A_{1700})$ in the infrared absorption spectrum may become 0.25 or more.

Next will be described a specific method for forming the aforementioned films by taking, as an example, formation of the film (P-1). The films other than the film (P-1) can be formed through the below-described method. In the method (coating method) for forming the film (P-1), a coating liquid containing the poly(carboxylic acid) polymer (A) and a solvent is applied onto a support (or a substrate), followed by evaporation of the solvent for drying, and subsequently a solution or dispersion (coating liquid) containing the polyvalent metal compound (B) and a solvent is applied onto the above-coated support, followed by evaporation of the solvent, to thereby form the adjacently arranged layers (a) and (b). The coating method encompasses a method in which a coating liquid containing a monomer of the poly(carboxylic acid) polymer (A) is applied onto a support, and the monomer is polymerized through irradiation with UV rays or electron beams, to thereby form the layer (a); and a method in which a monomer of the polymer (A) is deposited onto a support while the monomer is polymerized through irradiation with, for example, electron beams, to thereby form the layer (a). Also, the coating method encompasses a method in which the polyvalent metal compound (B) is deposited onto a support by means of a vapor-phase coating technique such as vapor deposition, sputtering, or ion plating, to thereby form the layer (b) containing the compound (B).

The coating liquid containing a solvent, and the poly(carboxylic acid) polymer (A) or the polyvalent metal compound (B) is applied onto a support by means of dipping, or a coating method employing a spray, a coater, or a printing apparatus. Examples of the coater, printing apparatus, and coating method which may be employed include coating methods such as a direct gravure method, a reverse gravure method, a kiss reverse gravure method, and an offset gravure method; and coaters employed in these methods, such as a gravure coater, a reverse roll coater, a micro-gravure coater, an air knife coater, a dip coater, a bar coater, a comma coater, and a die coater.

After the coating liquid; i.e., a solution or dispersion containing the poly(carboxylic acid) polymer (A) and a solvent, or a solution or dispersion containing the polyvalent metal compound (B) and a solvent, is applied onto a support, the solvent is evaporated for drying. No particular limitations are imposed on the method for evaporating the solvent. Examples of the evaporation method which may be employed include a method in which the solvent is naturally evaporated, a method in which the solvent is evaporated in an oven whose temperature is regulated at a predetermined level, and a method in which the solvent is evaporated in a drying apparatus equipped with the aforementioned coater, such as an arch dryer, a floating dryer, a drum dryer, or an infrared dryer. The evaporation conditions may be arbitrarily determined, so long as the support, the layer (a) formed of the poly(carboxylic acid) polymer (A), or the layer (b) formed of the polyvalent metal compound (B) is not damaged by heat.

No particular limitations are imposed on the order for applying, onto a support, the solution or dispersion (coating liquid) containing the poly(carboxylic acid) polymer (A) and a solvent, and the coating liquid containing the polyvalent metal compound (B) and a solvent, so long as at least one layer (a) and at least one layer (b) are adjacently formed on the support. However, preferably, the film (P-1) has at least one layer structure unit including the layers (a) and (b) which are adjacent to each other, from the viewpoint of the gas-barrier properties of the film. No particular limitations are imposed on the total thickness of the layers (a) and (b) formed on the support, but the total thickness is preferably 0.001 μm to 1 mm, more preferably 0.01 μm to 100 μm, much more preferably 0.1 μm to 10 μm. When the amount of the poly(carboxylic acid) polymer (A) or polyvalent metal compound (B) contained in the coating liquid, or the amount of the polymer (A)- or compound (B)-containing coating liquid to be applied onto the support is appropriately regulated, there can be produced the film (P-1) having at least one layer structure unit including the layers (a) and (b) which are adjacent to each other.

The film (P-1a) in which the layers (a) and (b) are formed on a support in the following order: layer (b)/layer (a)/layer (b) or layer (a)/layer (b)/layer (a) can be produced in a manner similar to that of the film (P-1).

The total amount (Bt) of the polyvalent metal compound (B) is preferably 0.2 eq or more on the basis of the total amount (At) of carboxyl groups contained in all the layers (a) and (b) which are adjacent to each other.

The coating liquid containing the poly(carboxylic acid) polymer (A) and a solvent can be prepared by dissolving or dispersing the polymer (A) in the solvent. No particular limitations are imposed on the solvent to be employed, so long as it can uniformly dissolve or disperse the poly(carboxylic acid) polymer (A) Specific examples of the solvent include water, methyl alcohol, ethyl alcohol, isopropyl alcohol, dimethyl sulfoxide, dimethylformamide, and dimethylacetamide. The poly(carboxylic acid) polymer (A) may be readily reacted with the polyvalent metal compound (B) in an aqueous solution, resulting in formation of non-uniform precipitates. Therefore, in the case where the coating liquid containing the poly(carboxylic acid) polymer (A) and a solvent is applied onto the layer (b) formed of the polyvalent metal compound (B), when the solvent is water, the poly(carboxylic acid) polymer (A) may be reacted with the polyvalent metal compound during application of the coating liquid, resulting in formation of non-uniform precipitates. Therefore, the solvent employed in the coating liquid is preferably a non-aqueous solvent, or a mixture of a non-aqueous solvent and water. As used herein, the term "non-aqueous solvent" refers to a solvent other than water. It is also preferable that the layer (a) or the layer (b) is formed on a substrate, followed by drying, and subsequently the layer (a) or the layer (b) is formed on the layer formed on the substrate such that the layers (a) and (b) are adjacent to each other.

No particular limitations are imposed on the amount of the poly(carboxylic acid) polymer (A) contained in the coating liquid containing the polymer (A) and a solvent, but, from the viewpoint of coating performance, the amount of the polymer (A) is preferably 0.1 wt. % to 50 wt. %. The coating liquid may optionally contain, in addition to the poly(carboxylic acid) polymer (A) and the solvent, for example, a polymer other than the polymer (A), a softening agent, a stabilizer, an anti-blocking agent, an adhesive, or an inorganic layered compound such as montmorillonite, so long as such an additive does not impede the gas-barrier properties of the film of the present invention, which is a final product produced from the film (P-1). The total amount of such an additive to be added is preferably 1 wt. % or less on the basis of the amount of the poly(carboxylic acid) polymer (A) contained in the coating liquid.

Similar to the above case, the coating liquid may contain a monovalent metal compound, so long as the compound does not impede the gas-barrier properties of the gas-barrier laminate of the present invention, which is a final product produced from the film (P-1).

The coating liquid containing the polyvalent metal compound (B) and a solvent can be prepared by dissolving or dispersing the compound (B) in the solvent. No particular limitations are imposed on the solvent to be employed, so long as it can uniformly dissolve or disperse the polyvalent metal compound (B). Specific examples of the solvent which may be employed include water, methyl alcohol, ethyl alcohol, isopropyl alcohol, n-propyl alcohol, n-butyl alcohol, n-pentyl alcohol, dimethyl sulfoxide, dimethylformamide, dimethylacetamide, toluene, hexane, heptane, cyclohexane, acetone, methyl ethyl ketone, diethyl ether, dioxane, tetrahydrofuran, ethyl acetate, and butyl acetate. As described above, the poly(carboxylic acid) polymer (A) may be readily reacted with the polyvalent metal compound in an aqueous solution, resulting in formation of non-uniform precipitates. Therefore, in the case where the coating liquid containing the polyvalent metal compound (B) and a solvent is applied onto the layer (a) formed of the poly(carboxylic acid) polymer (A), when the solvent is water, the poly(carboxylic acid) polymer (A) may be reacted with the polyvalent metal compound during application of the coating liquid, resulting in formation of non-uniform precipitates. Therefore, the solvent employed in the coating liquid is preferably a non-aqueous solvent, or a mixture of a non-aqueous solvent and water. As used herein, the term "non-aqueous solvent" refers to a solvent other than water.

The coating liquid containing the polyvalent metal compound (B) and a solvent may optionally contain, in addition the compound (B) and the solvent, for example, a resin, a dispersant, a surfactant, a softening agent, a stabilizer, a film-forming agent, an anti-blocking agent, or an adhesive. Particularly, in order to improve the dispersibility and coating performance of the polyvalent metal compound, preferably, a resin which is soluble in the solvent employed is added to the coating liquid. Preferred examples of the resin include resins employed for coating materials, such as alkyd resin, melamine resin, acrylic resin, nitrocellulose, urethane resin, polyester resin, phenolic resin, amino resin, fluorocarbon resin, and epoxy resin. The ratio by amount between the polyvalent metal compound (B) and the resin in the coating liquid may be arbitrarily determined, but, from the viewpoint of coating performance, the total amount of the polyvalent metal compound, the resin, and an additive other than the resin in the coating liquid is preferably 1 wt. % to 50 wt. %.

When the coating liquid containing the poly(carboxylic acid) polymer (A) and a solvent, or the coating liquid containing the polyvalent metal compound (B) and a solvent is applied onto a support (or a substrate), an adhesive may be applied in advance onto the surface of the support, in order to enhance adhesion between the support and the layer (a) or the layer (b). No particular limitations are imposed on the adhesive to be employed, and specific examples of the adhesive include solvent-soluble resins employed for dry laminating, anchor coating, or primers, such as alkyd resin, melamine resin, acrylic resin, nitrocellulose, urethane resin, polyester resin, phenolic resin, amino resin, fluorocarbon resin, and epoxy resin.

The film (P-2) formed from a mixture containing the poly(carboxylic acid) polymer (A) and the polyvalent metal compound (B) is preferably produced by applying, onto a support, a solution or dispersion of a mixture containing the poly(carboxylic acid) polymer (A), the polyvalent metal compound (B), a volatile base (C), and a solvent. Another embodiment of the film of the second invention group is the film (P-2-1) which is produced by applying, onto at least one surface of a support, a mixture of the poly(carboxylic acid) polymer (A), the polyvalent metal compound (B), a volatile base (C), and a solvent (e.g. water) in which the amounts of the compound (B) and the base (C) are 0.2 eq or more and 1.0 eq or more, respectively, on the basis of the amount of all the carboxyl groups contained in the polymer (A). The peak ratio $(A_{1560}/A_{1700})$ in an infrared absorption spectrum of the film (P-2) or (P-2-1) is less than 0.25.

Application of the mixture of the poly(carboxylic acid) polymer (A), the polyvalent metal compound (B), the volatile base (C), and water (i.e., solvent) can be performed in a manner similar to that described above in the case of the film (P-1); i.e., by means of the application method of the coating liquid containing the poly(carboxylic acid) polymer (A) and a solvent or containing the polyvalent metal compound (B) and a solvent.

Examples of the volatile base (C) include ammonia, methylamine, ethylamine, dimethylamine, diethylamine, triethylamine, morpholine, and ethanolamine. The poly(carboxylic acid) polymer (A) may be readily reacted with the polyvalent metal compound (B) in an aqueous solution, resulting in formation of non-uniform precipitates. Therefore, in order to uniformly mix the poly(carboxylic acid) polymer (A), the polyvalent metal compound (B), and water serving as a solvent together, the volatile base is added to the resultant mixture. The amount of the volatile base (C) required for obtaining a uniform dispersion or solution of the mixture is preferably 1 eq or more on the basis of the amount of all the carboxyl groups contained in the poly(carboxylic acid) polymer (A). In the case where the polyvalent metal compound is an oxide, hydroxide, or carbonate of cobalt, nickel, copper, or zinc, when the volatile base (C) is added in an amount of 1 eq or more, such a metal and the volatile base (C) together form a complex, and the mixture of the poly(carboxylic acid) polymer (A), the polyvalent metal compound (B), the volatile base (C), and water serving as a solvent becomes a transparent, uniform solution. The amount of the volatile base (C) to be added is more preferably 1.0 eq or more and 10 eq or less on the basis of the amount of all the carboxyl groups contained in the poly(carboxylic acid) polymer (A). The volatile base (C) to be employed is preferably ammonia.

The mixture of the poly(carboxylic acid) polymer (A), the polyvalent metal compound (B), the volatile base (C), and water serving as a solvent may be prepared by sequentially dissolving the poly(carboxylic acid) polymer (A), the polyvalent metal compound (B), and the volatile base (C) in water, but no particular limitations are imposed on the sequence of dissolution of these components in water. The amount of the poly(carboxylic acid) polymer (A) or the polyvalent metal compound (B) contained in the coating liquid containing the mixture is preferably 0.1 wt. % to 50 wt. %, from the viewpoint of coating performance. The coating liquid may optionally contain, in addition to the poly(carboxylic acid) polymer (A), the polyvalent metal compound (B), the volatile base (C), and the solvent, for example, a polymer other than the polymer (A), a solvent other than water, a monovalent metal compound, a softening agent, a stabilizer, an anti-blocking agent, an adhesive, or an inorganic layered compound (e.g., montmorillonite), so long as such an additive does not impede the gas-barrier properties of the film or laminate of the present invention, which is a final product produced from the aforementioned film (P-2) or (P-2-1).

The aforementioned film (P-2) is produced by applying, onto a support, the mixture of the poly(carboxylic acid) polymer (A), the polyvalent metal compound (B), the volatile base (C), and water serving as a solvent, followed by drying. In the resultant layer, which is formed on the support and contains the poly(carboxylic acid) polymer (A), the polyvalent metal compound (B), and the volatile base (C), the polyvalent metal compound is present in the form of particles, molecules, a metal salt of the poly(carboxylic acid) polymer (A), and a metal complex salt of the polycarboxylic acid. As used herein, the term "metal complex" refers to a complex formed of the volatile base and cobalt, nickel, copper, or zinc. Specific examples of the metal complex include a zinc-tetraammonium complex and a copper-tetraammonium complex. No particular limitations are imposed on the thickness of the above-formed layer containing the poly(carboxylic acid) polymer (A), the polyvalent metal compound (B), and the volatile base (C), but the thickness is preferably 0.001 μm to 1 mm, more preferably 0.01 μm to 100 μm, most preferably 0.1 μm to 10 μm.

When the thus-produced film or laminate, in which the peak ratio ($A_{1560}/A_{1700}$) in an infrared absorption spectrum thereof is less than 0.25, is stored in air at room temperature, the peak ratio ($A_{1560}/A_{1700}$) becomes 0.25 or more, and the film or laminate exhibits improved gas-barrier properties.

The third invention group (hereinafter may be referred to as "the present invention") relates to a method for producing the film or laminate of the first invention group. The third invention group provides a method for producing the film of the first invention group in which the peak ratio ($A_{1560}/A_{1700}$) is 0.25 or more in an infrared absorption spectrum of the film, which method comprises forming the film (P-1) or (P-2) of the second invention group; and allowing the film (P-1) or (P-2) to stand in an atmosphere having a relative humidity of 20% or more for promoting reaction between the poly(carboxylic acid) polymer (A) and the polyvalent metal compound (B) in layers constituting the film, or reaction between the poly(carboxylic acid) polymer (A) in the layer (a) and the polyvalent metal compound (B) in the layer (b), to thereby form a polyvalent metal salt of the poly(carboxylic acid) polymer (A). The third invention group also provides a method for producing the film of the first invention group in which the peak ratio ($A_{1560}/A_{1700}$) in an infrared absorption spectrum of the film is 0.25 or more, which method comprises forming, on a support, a film by means of a coating method from a solution or dispersion containing the poly(carboxylic acid) polymer (A) and a solvent, and a solution or dispersion containing the polyvalent metal compound (B) and a solvent, the film having at least one layer structure unit including the layer (a) formed of the poly(carboxylic acid) polymer (A) and the layer (b) formed of the polyvalent metal compound (B), with the layers (a) and (b) being adjacent to each other; and allowing the film to stand in an atmosphere having a relative humidity of 20%.

The third invention group also provides a method for producing the film of the first invention group in which the peak ratio ($A_{1560}/A_{1700}$) in an infrared absorption spectrum of the film is 0.25 or more, which method comprises forming, on a support, a coating film by means of a coating method from a solution or dispersion of a mixture containing the poly(carboxylic acid) polymer (A), the polyvalent metal compound (B), the volatile base (C), and a solvent; and allowing the thus-formed coating film to stand in an atmosphere having a relative humidity of 20% or more. Particularly, the last two of the above-described production methods can produce, without use of a film in which the peak ratio ($A_{1560}/A_{1700}$) is less than 0.25, the film of the first invention group in which the peak ratio ($A_{1560}/A_{1700}$) is 0.25 or more in an infrared absorption spectrum of the film, by applying, onto a support, a solution containing the poly(carboxylic acid) polymer (A) and a solvent and a solution containing the polyvalent metal compound (B) and a solvent, or a solution of a mixture containing the poly(carboxylic acid) polymer (A), the polyvalent metal compound (B), the volatile base (C), and a solvent, and by allowing the thus-formed film to stand in an atmosphere having a relative humidity of 20% or more. Therefore, these two production methods are suitable for the case where the film of the first invention group is to be produced from raw materials in the same production site.

As described above, the poly(carboxylic acid) polymer (A) may be readily reacted with the polyvalent metal compound (B) in an aqueous solution, resulting in formation of non-uniform precipitates. Once such precipitates are formed, difficulty is encountered in forming a film. In order to form a uniform film from the poly(carboxylic acid) polymer (A) and the polyvalent metal compound (B), firstly, the film (P-1) or the film (P-2) is formed by means of the method described above in the second invention group. In the film (P-1), the layer (a) formed of the poly(carboxylic acid) polymer (A) and the layer (b) formed of the polyvalent metal compound (B) are provided on a support such that the layers are adjacent to each other. In the film (P-2), a uniform layer formed from a mixture containing the poly(carboxylic acid) polymer (A) and the polyvalent metal compound (B) is provided on a support. As described above, when the film (P-1) or the film (P-2) is allowed to stand in an atmosphere (preferably at a relative humidity of 20% or more, more preferably at a relative humidity of 40 to 100% and a temperature of 5 to 200° C. for 1 second to 10 days, most preferably at a relative humidity of 60 to 100% and a temperature of 20 to 150° C. for 1 second to 5 days), the poly(carboxylic acid) polymer (A) and the polyvalent metal compound (B), which are contained in the film (P-1) or the film (P-2), react with each other, to thereby yield the film of the first invention group in which the peak ratio ($A_{1560}/A_{1700}$) is 0.25 or more in an infrared absorption spectrum thereof. The laminate of the first invention group can be produced through the following procedure: the film (P-1), the film (P-1a), the film (P-1-1) (i.e., an embodiment of the film (P-1)), the film (P-1a-1) (i.e., an embodiment of the film (P-1a)), the film (P-2), or the film (P-2-1), which is provided on at least one surface of a substrate appropriately selected from among materials employed as a support, is allowed to stand in an atmosphere (preferably at a relative humidity of 20% or more, more preferably at a relative humidity of 40 to 100% and a temperature of 5 to 200° C. for 1 second to 10 days, most preferably at a relative humidity of 60 to 100% and a temperature of 20 to 150° C. for 1 second to 5 days).

The expression "the film (P-1), the film (P-2), a film or coating film formed through application of a solution containing the poly(carboxylic acid) polymer (A) and a solvent and a solution containing the polyvalent metal compound (B) and a solvent, or a film or coating film formed through application of a solution of a mixture containing the poly(carboxylic acid) polymer (A), the polyvalent metal compound (B), the volatile base (C), and a solvent is allowed to stand in an atmosphere having a relative humidity of 20% or more" refers to the case where the film (P-1) or the film (P-2) is allowed to stand for a predetermined time in a vapor or liquid atmosphere in which the total pressure, the water vapor pressure, and the temperature are controlled. Preferred ranges of these parameters are as follows. The total pressure is preferably 0.001 MPa (0.01 atm) to 1,000 MPa (10,000 atm), more preferably 0.1 MPa (1 atm) to 10 MPa (100 atm), much more preferably 0.1 MPa (1 atm) to 1 MPa (10 atm). Within the above total pressure ranges, the water vapor pressure is preferably 0.001 MPa (0.01 atm) to 100 MPa (1,000 atm), more preferably 0.002 MPa (0.02 atm) to 10 MPa (100 atm), much more preferably 0.01 MPa (0.1 atm) to 1 MPa (10 atm).

The temperature preferably falls within a range of 5° C. to 200° C., more preferably 20° C. to 150° C., much more preferably 30° C. to 130° C.

No particular limitations are imposed on the time required for allowing the film to stand, since the time varies depending on the atmosphere in which the film is allowed to stand. For example, when the temperature, the total pressure, and the water vapor pressure are 100° C., 0.1 MPa, and 0.1 MPa, respectively (these conditions correspond to the case where the film is immersed in boiling water of 100° C.), the film is allowed to stand for about 10 seconds. Alternatively, when the temperature, the total pressure, and the water vapor pressure are 30° C., 0.1 MPa, and 0.034 MPa, respectively (these conditions correspond to the case where the film is allowed to stand in a vapor atmosphere having a temperature of 30° C., atmospheric pressure, and a relative humidity of 80%), the film is allowed to stand for about 24 hours. The film is allowed to stand under the above-exemplified conditions.

The expression "the film is allowed to stand in a liquid atmosphere" refers to, for example, the case where the film is immersed in water in which the temperature and the total pressure are controlled. In this case, the water vapor pressure can be regulated by mixing, with water, a water-soluble substance such as an inorganic salt, an alcohol (e.g., methyl alcohol, ethyl alcohol, or glycerin), or a polar solvent (e.g., dimethyl sulfoxide or dimethylformamide).

Specific examples of the method for allowing the film to stand include a batch-type method in which the film of the second invention group (e.g., the film (P-1) or the film (P-2), the laminate of the second invention group, a film or coating film formed through application of a solution containing the poly(carboxylic acid) polymer (A) and a solvent and a solution containing the polyvalent metal compound (B) and a solvent, or a film or coating film formed through application of a solution of a mixture containing the poly(carboxylic acid) polymer (A), the polyvalent metal compound (B), the volatile base (C), and a solvent is placed in a space (e.g., a thermostatic/humidistatic chamber or an autoclave) wherein the total pressure, the water vapor pressure, and the temperature are controlled, and then is allowed to stand therein for a predetermined time; a method in which such a film or coating film is continuously caused to pass through the space; a method in which such a film or coating film is continuously caused to pass through water in which the total pressure, the water vapor pressure, and the temperature are regulated to specific levels; and a method in which water vapor or water, whose temperature and pressure are controlled, is sprayed to such a film or coating film. When such a film or coating film is allowed to stand by means of the aforementioned methods, there can be produced the film or laminate of the first invention group in which the peak ratio ($A_{1560}/A_{1700}$) is 0.25 or more in an infrared absorption spectrum of the film. The film or laminate of the first invention group preferably exhibits an oxygen permeation coefficient of 1,000 cm$^3$(STP)·m/ (m$^2$·day·MPa) or less as measured at 30° C. and a relative humidity of 80%; i.e., exhibits gas-barrier properties.

The film or laminate exhibiting gas-barrier properties may be in the form of a laminate containing, in addition to the support, a layer laminated on the film. Such a laminate can be produced by laminating an arbitrary layer on the film of the second invention group, and allowing the resultant product to stand in an atmosphere having the aforementioned relative humidity. No particular limitations are imposed on the material of the arbitrary layer. Specifically, the material may be selected from among materials which can be employed in the support of the laminate of the first invention group. For example, one or more layers may be laminated on the film in accordance with purposes; for example, the purpose of imparting, to a multi-layer film or sheet, strength, sealability, easy-to-open property, good appearance, light shielding property, or moisture-barrier property. Lamination of the layer(s) is performed through coating of a layer material, or through a known lamination method by use of a film-like or sheet-like layer material with or without use of an adhesive. Specific examples of the lamination method include a dry lamination method, a wet lamination method, and an extrusion lamination method.

The film of the second invention group is formed by means of the coating method. Therefore, the film or laminate of the first invention group can be produced in the same production site through the following procedure: the film of the second invention group (hereinafter will be referred to as "film (P)") is produced by performing the coating method consecutively, and further performing a lamination process (e.g., coating, printing, or lamination) consecutively; and the thus-formed film (P) is allowed to stand in an atmosphere having the aforementioned relative humidity. From the viewpoint of industrial productivity, preferably, production of the film (P) and production of the film or laminate in which the peak ratio ($A_{1560}/A_{1700}$) in its infrared absorption spectrum is 0.25 or more are performed in a consecutive manner. The film or laminate of the first invention group can also be produced through the following method: a film or a coating film is formed by applying, onto a support, a solution containing the poly(carboxylic acid) polymer (A) and a solvent and a solution containing the polyvalent metal compound (B) and a solvent, or a solution of a mixture containing the poly(carboxylic acid) polymer (A), the polyvalent metal compound (B), the volatile base (C), and a solvent; and the thus-formed film or coating film is allowed to stand in an atmosphere having the aforementioned relative humidity. Since, in this method, application of the solution and allowing the film or coating film to stand are performed in the same production site, the film (P) (i.e., a precursor of the film or laminate of the first invention group) is not required to be formed. Therefore, this method is preferable, from the viewpoints of productivity and simplification of a production process.

The fourth invention group (hereinafter may be referred to as "the present invention") relates to use of the film of the first invention group, and to use of the film of the second invention group.

The film of the first invention group exhibits resistance to high temperature and humidity and excellent gas-barrier properties. Therefore, the film can be formed into a bag, a sheet, or a container, or the film can be employed as a packaging material for thermal sterilization.

The film of the second invention group can be formed into a bag, a sheet, or a container. When a product is packaged with the film, and then the thus-packaged product is allowed to stand in an atmosphere having a relative humidity of 20% or more, the peak ratio ($A_{1560}/A_{1700}$) in an infrared absorption spectrum of the film becomes 0.25 or more, and the film exhibits gas-barrier properties. Meanwhile, when the film is employed as a packaging material for thermal sterilization; for example, when a product is packaged with the film, and the thus-packaged product is thermally sterilized, formation of a polycarboxylic acid salt proceeds in the film (packaging material), whereby the film (packaging material) exhibits excellent gas-barrier properties.

The film or laminate of the first invention group is employed as a packaging material for gas-barrier materials, or a packaging material for thermal sterilization. Specific examples of the form of the packaging material include a flat pouch, a standing pouch, a pouch having a nozzle, a pillow bag, a gazette bag, and a shell-shaped packaging bag. When the material of the film or laminate is appropriately chosen, such a packaging material can be endowed with, for example, easy-to-open property, easy-to-tear property, shrinkability, applicability to microwave ovens, UV-shielding property, or good appearance. Specific examples of the form of a packaging container formed of the film or laminate include a bottle, a tray, a cup, a tube, a cap material for such a packaging container, and an opening-sealing material for such a packaging container. Similar to the case of the packaging material, when the material of the film or laminate is appropriately chosen, such a packaging container can be endowed with, for example, easy-to-open property, easy-to-tear property, shrinkability, applicability to microwave ovens, UV-shielding property, or good appearance.

The film, laminate for gas-barrier materials, or laminate for gas-barrier materials of the present invention, or a packaging container formed of the film or laminate is suitable for use as a packaging material, packaging container, or vacuum heat-insulating material for articles which are readily impaired by, for example, oxygen, including foods, beverages, chemicals, drugs, and precision metallic parts such as electronic parts.

In addition, the film or laminate is suitable for use as a packaging material for articles which require long-term reliable gas-barrier properties, and require a treatment (e.g., boiling or retorting) in high-temperature hot water. Specific examples of the articles which require a treatment (e.g., boiling or retorting) in high-temperature hot water include seasoned foods such as curry, stew, and pasta sauce; seasoning mixtures such as premix for Chinese foods; baby foods; cooked rice; rice gruel; cooked foods for toaster oven or microwave oven; soups; desserts; agricultural products; and livestock products. Examples of the agricultural products include foods which are to be cooked (retorted or boiled) for sterilization, such as grains (e.g., potato, sweet potato, corn, chestnut, and beans), vegetables (e.g., asparagus, broccoli, cabbage, bamboo shoot, and tomato), root vegetables (e.g., radish, carrot, yam, burdock, and lotus root), mushrooms, and fruits (e.g., apple and pineapple). Examples of the livestock products include sausage and ham.

When the film of the second invention group is allowed to stand in an atmosphere having a relative humidity of 20% or more, the resultant film is used as in the case of the film of the first invention group.

Each of these films is easily dissolved in an acid or an alkali under specific conditions, and exhibits good disposability; i.e., separation/recovery of the film can be readily carried out upon disposal thereof. Therefore, among the aforementioned uses of the film, the film is particularly suitable for use in the field where separation/recovery of a packaging material is required.

EXAMPLES

The present invention will next be described in detail by way of Examples, which should not be construed as limiting the invention thereto. Evaluation methods will now be described.

1. Peak Ratio $A_{1560}/A_{1700}$ in Infrared Absorption Spectrum (Ionization Degree Measurement Method)

In Examples, the peak ratio $A_{1560}/A_{1700}$ was determined on the basis of the peak height ratio in an infrared absorption spectrum of a film as measured by means of the ATR method, which is selected from among the above-described methods. In addition, the ionization degree of the film was determined.

2. Oxygen Permeability Measurement Method

The oxygen permeability of a film was measured by use of an oxygen permeability measuring apparatus (OXTRAN™ 2/20, product of Modern Control) under the following conditions: temperature: 30° C., relative humidity: 80%. The oxygen permeability is measured by means of JIS K-7126, B method (equal-pressure method) and the method specified by ASTM D3985-81, and the thus-measured value is represented by a unit of $cm^3(STP)/(m^2 \cdot day \cdot MPa)$. As used herein, "(STP)" refers to standard conditions (0° C., 1 atm) for specifying the volume of oxygen. Furthermore, the oxygen permeability was converted into an oxygen permeation coefficient by multiplying the measured oxygen permeability by the thickness of the film. The thus-obtained oxygen permeation coefficient is shown in the below-described tables together with the oxygen permeability.

3. Method for Evaluating Solubility of a Film in an Acid or an Alkali

Solubility of the film of the present invention or Comparative Example in an acid, an alkali, or neutral water was evaluated by means of the above-described method.

Table 1 shows poly(carboxylic acid) polymers employed in Examples and Comparative Examples described below.

Table 1 also shows the oxygen permeation coefficient of each of the poly(carboxylic acid) polymers employed in Examples and Comparative Examples, as measured under dry conditions (temperature: 30° C., relative humidity: 0%).

TABLE 1

| No. | Poly(carboxylic acid) polymer | Trade name | Manufacturer | Number average molecular weight/oxygen permeation coefficient* |
|---|---|---|---|---|
| 1 | Polyacrylic acid | Aron ™ A-10SL | Toagosei Co., Ltd. | 6,000/50 |
| 2 | Polyacrylic acid | Aron ™ A-10H | Toagosei Co., Ltd. | 200,000/50 |
| 3 | Polyacrylic acid | Jurymer ™ AC-10SH | Nihon Junyaku Co., Ltd. | 1,000,000/50 |
| 4 | Polymethacrylic acid | Reagent | Polyscience, Inc. | 5,000/200 |
| 5 | Polymaleic acid | Reagent | Polyscience, Inc. | 5,000/50 |

TABLE 1-continued

| No. | Poly(carboxylic acid) polymer | Trade name | Manufacturer | Number average molecular weight/oxygen permeation coefficient* |
|---|---|---|---|---|
| 6 | Polycarboxylic acid-acrylic acid ester copolymer | Aron ™ A-7050 | Toagosei Co., Ltd. | 1,000,000/20,000 |

Oxygen permeation coefficient*: (unit) $cm^3(STP) \cdot \mu m/(m^2 \cdot day \cdot MPa)$, as measured at 30° C. and a relative humidity of 0%

Examples 1 through 14 describe films according to the first, second, seventeenth, and eighteenth inventions, and laminates according to the fifteenth and twenty-fourth inventions, which inventions have been described in the section "Disclosure of the Invention."

These Examples describe the following processes: (1) a process in which a poly(carboxylic acid) polymer is applied onto a substrate, followed by drying, to thereby form a film, and subsequently a polyvalent metal compound is applied onto the thus-formed film, thereby preparing a laminate including the substrate/the poly(carboxylic acid) polymer/the polyvalent metal compound (i.e., the film according to the seventeenth or eighteenth invention, or the laminate according to the twenty-fourth invention); and (2) a process in which the thus-prepared laminate is allowed to stand in a water vapor atmosphere, to thereby form a polyvalent metal salt of the poly(carboxylic acid) polymer through solid-phase reaction. These Examples also describe the results of evaluation of the thus-formed laminate including the poly(carboxylic acid) polymer polyvalent metal salt (i.e., the film according to the first or second invention, or the laminate according to the fifteenth invention). In Examples 1 through 14, different types of poly(carboxylic acid) polymers and polyvalent metal compounds were employed, and different conditions were employed for forming poly(carboxylic acid) polymer polyvalent metal salts. Comparative Example 1 describes a laminate including a film formed from a poly(carboxylic acid) polymer—a film formed solely from the polymer exhibits an oxygen permeation coefficient of 1,000 $cm^3(STP) \cdot \mu m/(m^2 \cdot day \cdot MPa)$ or more as measured at 30° C. and a relative humidity of 0%—the polymer being employed in place of the poly(carboxylic acid) polymer employed in the Examples. Comparative Example 2 describes a laminate including a film formed from a cross-linked product of a poly(carboxylic acid) polymer, the cross-linked product being employed in place of the poly(carboxylic acid) polymer employed in the Examples.

Example 1

Polyacrylic acid (PAA) (Aron™ A-10H, product of Toagosei Co., Ltd., number average molecular weight: 200,000, 25 wt. % aqueous solution), serving as a poly(carboxylic acid) polymer, was diluted with distilled water, to thereby prepare a 10 wt. % aqueous solution. The thus-prepared aqueous solution was applied onto a stretched polyethylene terephthalate film (PET film: Lumirror™ S10, product of Toray Industries, Inc., thickness: 12 μm, percent thermal shrinkage through immersion at 90° C. for 30 seconds: 0.5%) by use of a bar coater (K303 PROOFER™, product of RK PRINT-COAT INSTRUMENT), followed by drying by use of a drier. The resultant coating film layer was found to have a thickness of 1.0 μm. Subsequently, a commercially available zinc-oxide-fine-particles-containing suspension (ZS303, product of Sumitomo Osaka Cement Co., Ltd., average particle size: 0.02 μm, solid content: 30 wt. %, solvent: toluene) was applied onto the above-obtained coating film by use of the aforementioned bar coater, followed by drying, to thereby produce a PET/PAA/ZnO (zinc oxide) laminate. The dry coating amount of the zinc oxide fine particles was found to be 1 g/m² (0.5 μm). The laminate was allowed to stand for 24 hours in a thermostatic/humidistatic chamber in which the temperature and relative humidity were controlled to 30° C. and 80%, respectively, so as to form a PAA zinc salt through migration of Zn ions into the PAA layer (solid-phase reaction), thereby yielding a laminate including the PAA zinc salt. The resultant laminate was evaluated in terms of ionization degree, peak ratio ($A_{1560}/A_{1700}$) in an infrared absorption spectrum, oxygen permeability, and solubility in an acid or an alkali by means of the above-described methods. The PET/PAA/ZnO (zinc oxide) laminate was also subjected to measurement of an infrared absorption spectrum before being allowed to stand in the aforementioned atmosphere, and the peak ratio ($A_{1560}/A_{1700}$) in the thus-measured spectrum was determined.

Example 2

The procedure of Example 1 was repeated, except that the polyacrylic acid (Aron™ A-10H) was replaced by polyacrylic acid (Aron™ A-10SL, product of Toagosei Co., Ltd., number average molecular weight: 6,000, 40 wt. % aqueous solution), to thereby produce a laminate. The laminate was subjected to evaluation in a manner similar to that of Example 1.

Example 3

The procedure of Example 1 was repeated, except that the polyacrylic acid (Aron™ A-10H) was replaced by polyacrylic acid (Jurymer™ AC-10SH, product of Nihonjunyaku Co., Ltd., number average molecular weight: 1,000,000, 10 wt. % aqueous solution), to thereby produce a laminate. The laminate was subjected to evaluation in a manner similar to that of Example 1.

Example 4

The procedure of Example 1 was repeated, except that the polyacrylic acid (Aron™ A-10H) was replaced by polymethacrylic acid (reagent, product of Polyscience, Inc., average molecular weight: 5,000), to thereby produce a laminate. The laminate was subjected to evaluation in a manner similar to that of Example 1.

Example 5

The procedure of Example 1 was repeated, except that the polyacrylic acid (Aron™ A-10H) was replaced by polymaleic acid (reagent, product of Polyscience, Inc., average molecular weight: 5,000), to thereby produce a laminate. The laminate was subjected to evaluation in a manner similar to that of Example 1.

Example 6

The procedure of Example 1 was repeated, except that the zinc oxide fine particles were replaced by magnesium oxide (MgO) fine particles (reagent, product of Wako Pure Chemical Industries, Ltd., average particle size: 0.01 µm), to thereby produce a laminate. The laminate was subjected to evaluation in a manner similar to that of Example 1. The magnesium oxide fine particles were dispersed in ethanol by use of an ultrasonic homogenizer to thereby prepare a suspension (MgO content: 10%), and the thus-prepared MgO suspension was employed for producing the laminate. The dry coating amount of MgO contained in the thus-produced laminate was found to be 1 g/m$^2$ (0.5 µm).

Example 7

The procedure of Example 1 was repeated, except that the zinc oxide fine particles were replaced by magnesium methoxide (reagent, product of Aldrich Chemical Company Inc., 7.4 wt. % methanol solution), to thereby produce a laminate. The laminate was subjected to evaluation in a manner similar to that of Example 1. The dry coating amount of magnesium methoxide contained in the thus-produced laminate was found to be 1 g/m$^2$ (0.5 µm).

Example 8

The procedure of Example 1 was repeated, except that the zinc oxide fine particles were replaced by copper oxide (CuO) (reagent, product of Wako Pure Chemical Industries, Ltd.), to thereby produce a laminate. The laminate was subjected to evaluation in a manner similar to that of Example 1. The copper oxide was formed into fine particles by use of an agate mortar, the resultant fine particles were dispersed in ethanol by use of an ultrasonic homogenizer to thereby prepare a suspension (CuO content: 10 wt. %), and the thus-prepared CuO suspension was employed for producing the laminate. The dry coating amount of CuO contained in the thus-produced laminate was found to be 1 g/m$^2$ (0.5 µm).

Example 9

The procedure of Example 1 was repeated, except that the zinc oxide fine particles were replaced by calcium carbonate (CaCO$_3$) (reagent, product of Wako Pure Chemical Industries, Ltd.), to thereby produce a laminate. The laminate was subjected to evaluation in a manner similar to that of Example 1. The calcium carbonate was formed into fine particles by use of an agate mortar, the resultant fine particles were dispersed in ethanol by use of an ultrasonic homogenizer to thereby prepare a suspension (CaCO$_3$ content: 10 wt. %), and the thus-prepared CaCO$_3$ suspension was employed for producing the laminate. The dry coating amount of CaCO$_3$ contained in the thus-produced laminate was found to be 1 g/m$^2$ (0.5 µm).

Example 10

The procedure of Example 1 was repeated, except that the polyacrylic acid (Aron™ A-10H) was replaced by a product prepared by partially neutralizing the polyacrylic acid with Na, to thereby produce a laminate. The laminate was subjected to evaluation in a manner similar to that of Example 1. The partially neutralized product was prepared by dissolving sodium hydroxide in the 10 wt. % aqueous polyacrylic acid solution prepared in Example 1. Sodium hydroxide was added to the aqueous polyacrylic acid solution such that the amount of Na was 10 mol % on the basis of the amount by mol of carboxyl groups contained in the solution.

Example 11

The procedure of Example 1 was repeated, except that the polyacrylic acid (Aron™ A-10H) was replaced by a product prepared by partially neutralizing the polyacrylic acid with Na, to thereby produce a laminate. The laminate was subjected to evaluation in a manner similar to that of Example 1. The partially neutralized product was prepared by dissolving sodium hydroxide in the 10 wt. % aqueous polyacrylic acid solution prepared in Example 1. Sodium hydroxide was added to the aqueous polyacrylic acid solution such that the amount of Na was 20 mol % on the basis of the amount by mol of carboxyl groups contained in the solution.

Example 12

The procedure of Example 1 was repeated, except that the PAA zinc salt formation conditions (temperature: 30° C., relative humidity: 80%, 24 hours) were replaced by the below-described conditions, to thereby produce a laminate. The laminate was subjected to evaluation in a manner similar to that of Example 1. In this Example, the PET/PAA/ZnO laminate was allowed to stand for two hours in a thermostatic/humidistatic chamber in which the temperature and relative humidity were controlled to 60° C. and 80%, respectively, so as to form a PAA zinc salt through migration of Zn ions into the PAA layer (solid-phase reaction), thereby yielding a laminate including the PAA zinc salt.

Example 13

The procedure of Example 1 was repeated, except that the PAA zinc salt formation conditions (temperature: 30° C., relative humidity: 80%, 24 hours) were replaced by the below-described conditions, to thereby produce a laminate. The laminate was subjected to evaluation in a manner similar to that of Example 1. In this Example, the PET/PAA/ZnO laminate was allowed to stand for one hour in a thermostatic/humidistatic chamber in which the temperature and relative humidity were controlled to 90° C. and 80%, respectively, so as to form a PAA zinc salt through migration of Zn ions into the PAA layer (solid-phase reaction), thereby yielding a laminate including the PAA zinc salt.

Example 14

The procedure of Example 1 was repeated, except that the PAA zinc salt formation conditions (temperature: 30° C., relative humidity: 80%, 24 hours) were replaced by the below-described conditions, to thereby produce a laminate. The laminate was subjected to evaluation in a manner similar to that of Example 1. In this Example, the PET/PAA/ZnO laminate was treated with steam by use of an autoclave at 120° C. and a gauge pressure of 1 kg/cm$^2$ for 15 minutes. Before the steam treatment, the laminate was vacuum-packaged in a pouch formed from a commercially available unstretched polypropylene film (CPP) for the purpose of protection of the laminate. The polypropylene film pouch sufficiently enabled water vapor to penetrate into the pouch under high temperature and pressure, to thereby form a PAA zinc salt through migration of Zn ions into the PAA layer (solid-phase reaction). After completion of the steam treatment, the resultant laminate including the PAA zinc salt was removed from the pouch.

Comparative Example 1

The procedure of Example 1 was repeated, except that the polyacrylic acid (Aron™ A-10H) was replaced by a polycarboxylic acid-acrylic acid ester copolymer (Aron™ A-7050, product of Toagosei Co., Ltd., alkali-soluble emulsion), to thereby produce a laminate. The laminate was subjected to evaluation in a manner similar to that of Example 1.

Comparative Example 2

A 10 wt. % aqueous solution of polyvinyl alcohol (PVA: Poval™ 105, product of Kuraray Co., Ltd.) was prepared. Subsequently, sodium hydroxide was added to and dissolved in a 10 wt. % aqueous solution of polyacrylic acid (Aron™ A-10H, product of Toagosei Co., Ltd.), to thereby prepare a 10 wt. % aqueous solution of partially neutralized PAA. Sodium hydroxide was added to the aqueous polyacrylic acid solution such that the amount of Na was 10 mol % on the basis of the amount by mol of carboxyl groups contained in the solution. The aqueous partially neutralized PAA solution (70 parts by mass) was mixed with the aqueous PVA solution (30 parts by mass). The resultant mixture was applied onto a stretched polyethylene terephthalate film similar to that employed in Example 1 by use of a bar coater (K303 PROOFER™, product of RK PRINT-COAT INSTRUMENT), followed by drying by use of a drier. The resultant coating film layer was found to have a thickness of 1.0 μm.

The thus-formed laminate was thermally treated for 15 minutes in an oven whose temperature was regulated to 200° C., to thereby form, on the PET film, a cross-linked structure through ester bonding between PAA and PVA. The laminate including the thus-formed cross-linked structure was immersed in 1 g/l aqueous magnesium hydroxide solution, and subjected to ion cross-linking by use of an autoclave at 130° C. and 1.5 kg/m$^2$ for 20 minutes. As a result, there was produced a laminate including a layer formed of a magnesium salt of the PAA-PVA cross-linked structure, the layer being provided on the PET film.

The magnesium salt of the cross-linked structure can be prepared through the process described in Example 2 (page 15) of Japanese Patent Application Laid-Open (kokai) No. 10-237180 filed by the present inventors. The above-produced laminate was subjected to evaluation in a manner similar to that of Example 1.

Table 2 shows the results of evaluation of the laminates of Examples 1 through 14 and Comparative Examples 1 and 2.

TABLE 2

| | Poly(carboxylic acid) polymer | Polyvalent metal compound | Total thickness of coating layer (μm) | Chemical equivalent of polyvalent metal compound | *1 (° C.) | Solubility in acid or alkali | | |
|---|---|---|---|---|---|---|---|---|
| | | | | | | Acid | Neutral | Alkali |
| Ex. 1 | PAA MW: 200,000 | ZnO | 1.5 | 1.3 | 30 | Soluble | Insoluble | Soluble |
| Ex. 2 | PAA MW: 6000 | ZnO | 1.5 | 1.3 | 30 | Soluble | Insoluble | Soluble |
| Ex. 3 | PAA MW: 1,000,000 | ZnO | 1.5 | 1.3 | 30 | Soluble | Insoluble | Soluble |
| Ex. 4 | Polymethacrylic acid | ZnO | 1.5 | 1.5 | 30 | Soluble | Insoluble | Soluble |
| Ex. 5 | Polymaleic acid | ZnO | 1.5 | 1.0 | 30 | Soluble | Insoluble | Soluble |
| Ex. 6 | PAA MW: 200,000 | MgO | 1.5 | 2.6 | 30 | Soluble | Insoluble | Soluble |
| Ex. 7 | PAA MW: 200,000 | Magnesium methoxide | 1.5 | 1.2 | 30 | Soluble | Insoluble | Soluble |
| Ex. 8 | PAA MW: 200,000 | CuO | 1.5 | 1.3 | 30 | Soluble | Insoluble | Soluble |
| Ex. 9 | PAA MW: 200,000 | CaCO$_3$ | 1.5 | 1.0 | 30 | Soluble | Insoluble | Soluble |
| Ex. 10 | Partially neutralized (10 mol %) PAA | ZnO | 1.5 | 1.3 | 30 | Soluble | Insoluble | Soluble |
| Ex. 11 | Partially neutralized (20 mol %) PAA | ZnO | 1.5 | 1.3 | 30 | Soluble | Insoluble | Soluble |
| Ex. 12 | PAA MW: 200,000 | ZnO | 1.5 | 1.3 | 60 | Soluble | Insoluble | Soluble |
| Ex. 13 | PAA MW: 200,000 | ZnO | 1.5 | 1.3 | 90 | Soluble | Insoluble | Soluble |
| Ex. 14 | PAA MW: 200,000 | ZnO | 1.5 | 1.3 | 120 | Soluble | Insoluble | Soluble |
| Comp. Ex. 1 | Polycarboxylic acid-acrylic acid ester copolymer | ZnO | 1.5 | 2.6 | 30 | Insoluble | Insoluble | Soluble |
| Comp. Ex. 2 | PAA cross-linked structure | Mg(OH)$_2$ | 1.0 | 0.5 | 130 | Insoluble | Insoluble | Insoluble |

| | Ionization degree | Peak ratio 1 *2 | Peak ratio 2 *2 | Oxygen permeability *3 | Oxygen permeation coefficient *4 |
|---|---|---|---|---|---|
| Ex. 1 | 0.8 | 0.05 | 4.0 | 10 | 15 |
| Ex. 2 | 0.8 | 0.05 | 4.0 | 10 | 15 |
| Ex. 3 | 0.8 | 0.05 | 4.0 | 10 | 15 |
| Ex. 4 | 0.8 | 0.05 | 4.0 | 10 | 15 |
| Ex. 5 | 0.8 | 0.05 | 4.0 | 10 | 15 |
| Ex. 6 | 0.8 | 0.05 | 4.0 | 100 | 150 |
| Ex. 7 | 0.8 | 0.05 | 4.0 | 100 | 150 |
| Ex. 8 | 0.8 | 0.05 | 4.0 | 100 | 150 |

TABLE 2-continued

|   | *1 | *2 | pH | *3 | *4 |
|---|---|---|---|---|---|
| Ex. 9 | 0.8 | 0.05 | 4.0 | 100 | 150 |
| Ex. 10 | 0.9 | 0.12 | 9.0 | 5 | 7.5 |
| Ex. 11 | 0.9 | 0.19 | 9.0 | 10 | 15 |
| Ex. 12 | 0.9 | 0.05 | 9.0 | 1 | 1.5 |
| Ex. 13 | 0.9 | 0.05 | 9.0 | 1 | 1.5 |
| Ex. 14 | 0.9 | 0.05 | 9.0 | 1 | 1.5 |
| Comp. Ex. 1 | 0.8 | 0.05 | 4.0 | 1400 | 2100 |
| Comp. Ex. 2 | 0.5 | 0.12 | 1.0 | 1 | 1.5 |

*Oxygen permeability of PET film serving as a substrate: 1,400 cm$^3$/m$^2$ · day · MPa (30° C., 80% RH)
*1: temperature for formation of a carboxylic acid metal salt
*2: $A_{1560}/A_{1700}$: peak ratio 1 and peak ratio 2 were determined before and after treatment in a water vapor atmosphere, respectively
*3: (unit) cm$^3$(STP)/m$^2$ · day · MPa (30° C., 80% RH) (oxygen permeability)
*4: (unit) cm$^3$(STP) · μm/m$^2$ · day · MPa (30° C., 80% RH) (oxygen permeation coefficient)

As is clear from Table 2, the laminate of the present invention (i.e., each of the laminates of Examples 1 through 14) exhibits excellent oxygen gas-barrier properties, stability to neutral water, and solubility in an acid or an alkali. In contrast, in the case of Comparative Example 1, in which the poly(carboxylic acid) polymer employed in the Examples is replaced by a poly(carboxylic acid) polymer—a film formed solely from the polymer exhibits an oxygen permeation coefficient of 1,000 cm$^3$ (STP)·μm/(m$^2$·day·MPa) or more as measured at 30° C. and a relative humidity of 0%—the laminate exhibits excessively high oxygen permeability, whereas in the case of Comparative Example 2, in which the poly(carboxylic acid) polymer employed in the Examples is replaced by a PVA cross-linked structure, the laminate is insoluble in an acid and an alkali, although exhibiting excellent oxygen gas-barrier properties.

Examples 15 through 29 describe films according to the first, fifth, seventeenth, and twenty-second inventions, and laminates according to the fifteenth and twenty-fourth inventions, which inventions have been described in the section "Disclosure of the Invention." These Examples describe the following processes: (1) a process in which a volatile base is added to an aqueous poly(carboxylic acid) polymer solution, and a polyvalent metal compound is mixed with, dissolved in, or dispersed in the resultant mixture, to thereby prepare a coating liquid; (2) a process in which the coating liquid is applied onto a substrate, followed by drying, to thereby form a laminate including a complex formed of the poly(carboxylic acid) polymer and the polyvalent metal (i.e., the film according to the fifth, seventeenth, or eighteenth invention, or the laminate according to the twenty-fourth invention); and (3) a process in which the thus-formed laminate is subjected to treatment in a water vapor atmosphere, to thereby form, through solid-phase reaction, a poly(carboxylic acid) polymer polyvalent metal salt (i.e., the film according to the first or fifth invention, or the laminate according to the fifteenth invention). These Examples also describe the results of evaluation of the thus-obtained laminate including the film formed from the poly(carboxylic acid) polymer and the polyvalent metal compound. In Examples 15 through 28, different types and amounts of polyvalent metal compounds and different types of volatile bases were employed, and the polymers were employed in different amounts. In Examples 29 through 31, different conditions were employed for forming poly(carboxylic acid) polymer polyvalent metal salts. Example 32 describes a single-layer film of the present invention (i.e., the film according to the first or fifth invention). Comparative Example 3 describes a laminate including a film formed from a poly(carboxylic acid) polymer—a film formed solely from the polymer exhibits an oxygen permeation coefficient of 1,000 cm$^3$(STP)·μm/(m$^2$·day·MPa) or more as measured at 30° C. and a relative humidity of 0%—the polymer being employed in place of the poly(carboxylic acid) polymer employed in the Examples.

Example 15

Polyacrylic acid (PAA) (Aron™ A-10H, product of Toagosei Co., Ltd., number average molecular weight: 200,000, 25 wt. % aqueous solution) was employed as a poly(carboxylic acid) polymer. Aqueous ammonia (reagent, product of Wako Pure Chemical Industries, Ltd., 28 wt. % aqueous ammonia solution) serving as a volatile base, zinc oxide (reagent, product of Wako Pure Chemical Industries, Ltd.), and distilled water were sequentially added to the aqueous PAA solution, and mixed together by use of an ultrasonic homogenizer, to thereby prepare a coating liquid having the below-described formulation. Zinc oxide completely dissolved in the coating liquid through formation of a complex between the volatile base (ammonia) and zinc, and the coating liquid became a transparent, uniform solution.

(Coating Liquid Formulation)

| | |
|---|---|
| 25 wt. % Aqueous PAA solution | 250 g |
| 28 wt. % Aqueous ammonia solution | 210 g |
| Zinc oxide | 35 g |
| Distilled water | 505 g |
| Total | 1,000 g |

In the above coating liquid, the amounts of ammonia and zinc oxide are 400 mol % (4 eq) and 50 mol % (1 eq), respectively, on the basis of the total amount of carboxyl groups contained in the PAA, and the PAA concentration is 6.3 wt. %. The coating liquid was applied onto a stretched polyethylene terephthalate film similar to that employed in Example 1 by use of a bar coater (K303 PROOFER™, product of RK PRINT-COAT INSTRUMENT), followed by drying by use of a drier. Zinc contained in the resultant laminate is in the form of a zinc salt of polyacrylic acid and a zinc-ammonium complex salt of polyacrylic acid. Therefore, the laminate was allowed to stand for 24 hours in a thermostatic/humidistatic chamber in which the temperature and relative humidity were controlled to 50° C. and 20%, respectively, to thereby convert the zinc-ammonium complex salt of polyacrylic acid into a polyacrylic acid zinc salt. As a result, a laminate including PET/PAA zinc salt was produced. The coating film containing the PAA zinc salt was found to have a thickness of 1.0 μm. The thus-produced laminate was evaluated in terms of ionization degree, peak ratio ($A_{1560}/A_{1700}$) in an infrared absorption spectrum, oxygen permeability, and solubility in an acid or an alkali by means of the above-described methods.

Example 16

The procedure of Example 15 was repeated, except that the coating liquid formulation was changed as described below, to thereby produce a laminate. The laminate was subjected to evaluation in a manner similar to that of Example 15.
(Coating Liquid Formulation)

| | |
|---|---|
| 25 wt. % Aqueous PAA solution | 250 g |
| 28 wt. % Aqueous ammonia solution | 210 g |
| Zinc oxide | 17 g |
| Distilled water | 523 g |
| Total | 1,000 g |

In the above coating liquid, the amounts of ammonia and zinc oxide are 400 mol % (4 eq) and 25 mol % (0.5 eq), respectively, on the basis of the total amount of carboxyl groups contained in the PAA, and the PAA concentration is 6.3 wt. %.

Example 17

The procedure of Example 15 was repeated, except that the coating liquid formulation was changed as described below, to thereby produce a laminate. The laminate was subjected to evaluation in a manner similar to that of Example 15.
(Coating Liquid Formulation)

| | |
|---|---|
| 25 wt. % Aqueous PAA solution | 250 g |
| 28 wt. % Aqueous ammonia solution | 315 g |
| Zinc oxide | 70 g |
| Distilled water | 365 g |
| Total | 1,000 g |

In the above coating liquid, the amounts of ammonia and zinc oxide are 600 mol % (6 eq) and 100 mol % (2 eq), respectively, on the basis of the total amount of carboxyl groups contained in the PAA, and the PAA concentration is 6.3 wt. %. Excessive zinc oxide with respect to PAA was not dissolved but dispersed in the coating liquid.

Example 18

The procedure of Example 15 was repeated, except that the coating liquid formulation was changed as described below, to thereby produce a laminate. The laminate was subjected to evaluation in a manner similar to that of Example 15.
(Coating Liquid Formulation)

| | |
|---|---|
| 25 wt. % Aqueous PAA solution | 250 g |
| 28 wt. % Aqueous ammonia solution | 210 g |
| Copper oxide | 34 g |
| Distilled water | 506 g |
| Total | 1,000 g |

In Example 18, copper oxide (reagent, product of Wako Pure Chemical Industries, Ltd.) was employed as a polyvalent metal compound. In the above coating liquid, the amounts of ammonia and copper oxide are 400 mol % (4 eq) and 50 mol % (1 eq), respectively, on the basis of the total amount of carboxyl groups contained in the PAA, and the PAA concentration is 6.3 wt. %. The coating liquid was found to be transparent and uniform.

Example 19

The procedure of Example 15 was repeated, except that the coating liquid formulation was changed as described below, to thereby produce a laminate. The laminate was subjected to evaluation in a manner similar to that of Example 15.
(Coating Liquid Formulation)

| | |
|---|---|
| 25 wt. % Aqueous PAA solution | 250 g |
| 28 wt. % Aqueous ammonia solution | 210 g |
| Nickel oxide | 33 g |
| Distilled water | 507 g |
| Total | 1,000 g |

In Example 19, nickel oxide (reagent, product of Wako Pure Chemical Industries, Ltd.) was employed as a polyvalent metal compound. In the above coating liquid, the amounts of ammonia and nickel oxide are 400 mol % (4 eq) and 50 mol % (1 eq), respectively, on the basis of the total amount of carboxyl groups contained in the PAA, and the PAA concentration is 5 wt. %. The coating liquid was found to be transparent and uniform.

Example 20

The procedure of Example 15 was repeated, except that the coating liquid formulation was changed as described below, to thereby produce a laminate. The laminate was subjected to evaluation in a manner similar to that of Example 15.
(Coating Liquid Formulation)

| | |
|---|---|
| 25 wt. % Aqueous PAA solution | 250 g |
| 28 wt. % Aqueous ammonia solution | 210 g |
| Cobalt oxide | 32 g |
| Distilled water | 508 g |
| Total | 1,000 g |

In Example 20, cobalt oxide (reagent, product of Wako Pure Chemical Industries, Ltd.) was employed as a polyvalent metal compound. In the above coating liquid, the amounts of ammonia and cobalt oxide are 400 mol % (4 eq) and 50 mol % (1 eq), respectively, on the basis of the total amount of carboxyl groups contained in the PAA, and the PAA concentration is 6.3 wt. %. The coating liquid was found to be transparent and uniform.

Example 21

The procedure of Example 15 was repeated, except that the coating liquid formulation was changed as described below, to thereby produce a laminate. The laminate was subjected to evaluation in a manner similar to that of Example 15.

(Coating Liquid Formulation)

| | |
|---|---|
| 25 wt. % Aqueous PAA solution | 250 g |
| 28 wt. % Aqueous ammonia solution | 210 g |
| Magnesium oxide | 17 g |
| Distilled water | 523 g |
| Total | 1,000 g |

In Example 21, magnesium oxide fine particles (reagent, product of Wako Pure Chemical Industries, Ltd., average particle size: 0.01 μm) were employed as a polyvalent metal compound. In the above coating liquid, the amounts of ammonia and magnesium oxide are 400 mol % (4 eq) and 50 mol % (1 eq), respectively, on the basis of the total amount of carboxyl groups contained in the PAA, and the PAA concentration is 6.3 wt. %. A portion of the magnesium oxide fine particles was not dissolved but uniformly dispersed in the coating liquid.

Example 22

The procedure of Example 15 was repeated, except that the coating liquid formulation was changed as described below, to thereby produce a laminate. The laminate was subjected to evaluation in a manner similar to that of Example 15.
(Coating Liquid Formulation)

| | |
|---|---|
| 25 wt. % Aqueous PAA solution | 250 g |
| 28 wt. % Aqueous ammonia solution | 210 g |
| Calcium carbonate | 44 g |
| Distilled water | 496 g |
| Total | 1,000 g |

In Example 22, calcium carbonate fine particles (prepared by crushing a calcium carbonate reagent (product of Wako Pure Chemical Industries, Ltd.) by use of an agate mortar) were employed as a polyvalent metal compound. In the above coating liquid, the amounts of ammonia and calcium carbonate are 400 mol % (4 eq) and 50 mol % (1 eq), respectively, on the basis of the total amount of carboxyl groups contained in the PAA, and the PAA concentration is 6.3 wt. %. A portion of the calcium carbonate fine particles was not dissolved but uniformly dispersed in the coating liquid.

Example 23

The procedure of Example 15 was repeated, except that the coating liquid formulation was changed as described below, to thereby produce a laminate. The laminate was subjected to evaluation in a manner similar to that of Example 15.
(Coating Liquid Formulation)

| | |
|---|---|
| 25 wt. % Aqueous PAA solution | 250 g |
| 28 wt. % Aqueous ammonia solution | 210 g |
| Zinc oxide | 28 g |
| Sodium hydroxide | 7 g |
| Distilled water | 505 g |
| Total | 1,000 g |

In Example 23, sodium hydroxide was added to the coating liquid, thereby neutralizing a portion of carboxyl groups (20 mol %) contained in the PAA. Zinc oxide was employed as a polyvalent metal compound. In the above coating liquid, the amounts of ammonia, zinc oxide, and sodium are 400 mol % (4 eq), 40 mol % (0.8 eq), and 20 mol % (0.2 eq), respectively, on the basis of the total amount of carboxyl groups contained in the PAA, and the PAA concentration is 6.3 wt. %.

Example 24

The procedure of Example 15 was repeated, except that monomethylamine (reagent, product of Wako Pure Chemical Industries, Ltd.) was employed as a volatile base in place of ammonia employed in Example 15, whereby a laminate was produced and then evaluated. The coating liquid formulation of this Example is as follows.
(Coating Liquid Formulation)

| | |
|---|---|
| 25 wt. % Aqueous PAA solution | 250 g |
| Monomethylamine | 107 g |
| Zinc oxide | 35 g |
| Distilled water | 608 g |
| Total | 1,000 g |

In the above coating liquid, the amounts of monomethylamine and zinc oxide are 400 mol % (4 eq) and 50 mol % (1 eq), respectively, on the basis of the total amount of carboxyl groups contained in the PAA, and the PAA concentration is 6.3 wt. %.

Example 25

The procedure of Example 15 was repeated, except that the coating liquid formulation was changed as described below, to thereby produce a laminate. The laminate was subjected to evaluation in a manner similar to that of Example 15.
(Coating Liquid Formulation)

| | |
|---|---|
| 25 wt. % Aqueous PAA solution | 250 g |
| 28 wt. % Aqueous ammonia solution | 210 g |
| Copper oxide | 17 g |
| Zinc oxide | 17 g |
| Distilled water | 506 g |
| Total | 1,000 g |

In Example 25, a mixture of copper oxide (reagent, product of Wako Pure Chemical Industries, Ltd.) and zinc oxide (reagent, product of Wako Pure Chemical Industries, Ltd.) was employed as a polyvalent metal compound. In the above coating liquid, the amounts of ammonia, copper oxide, and zinc oxide are 400 mol % (4 eq), 25 mol % (0.5 eq), and 25 mol % (0.5 eq), respectively, on the basis of the total amount of carboxyl groups contained in the PAA, and the PAA concentration is 6.3 wt. %. The coating liquid was found to be transparent and uniform.

Example 26

The procedure of Example 15 was repeated, except that the coating liquid formulation was changed as described below, to thereby produce a laminate. The laminate was subjected to evaluation in a manner similar to that of Example 15.

(Coating Liquid Formulation)

| | |
|---|---|
| 25 wt. % Aqueous PAA solution | 250 g |
| 28 wt. % Aqueous ammonia solution | 210 g |
| Magnesium oxide | 8 g |
| Zinc oxide | 17 g |
| Distilled water | 515 g |
| Total | 1,000 g |

In Example 26, a mixture of magnesium oxide (reagent, product of Wako Pure Chemical Industries, Ltd., average particle size: 0.01 μm) and zinc oxide (reagent, product of Wako Pure Chemical Industries, Ltd.) was employed as a polyvalent metal compound. In the above coating liquid, the amounts of ammonia, magnesium oxide, and zinc oxide are 400 mol % (4 eq), 25 mol % (0.5 eq), and 25 mol % (0.5 eq), respectively, on the basis of the total amount of carboxyl groups contained in the PAA, and the PAA concentration is 6.3 wt. %. A portion of the magnesium oxide was not dissolved but uniformly dispersed in the coating liquid.

Example 27

The procedure of Example 17 was repeated, except that ammonium carbonate was added to the coating liquid employed in Example 17, to thereby produce a laminate. The laminate was subjected to evaluation in a manner similar to that of Example 17.

(Coating Liquid Formulation)

| | |
|---|---|
| 25 wt. % Aqueous PAA solution | 250 g |
| 28 wt. % Aqueous ammonia solution | 315 g |
| Zinc oxide | 70 g |
| Ammonium carbonate | 162 g |
| Distilled water | 203 g |
| Total | 1,000 g |

In the above coating liquid, the amount of zinc oxide is 100 mol % (2 eq) on the basis of the total amount of carboxyl groups contained in the PAA, and the PAA concentration is 6.3 wt. %. An excess amount of zinc oxide—which did not dissolve in the coating liquid in the case of Example 17—and the added ammonium carbonate together formed a zinc ammonium carbonate complex, and the complex dissolved in the coating liquid, whereby the coating liquid became a transparent, uniform solution.

Example 28

The procedure of Example 27 was repeated, except that the coating liquid formulation was changed as described below, to thereby produce a laminate. The laminate was subjected to evaluation in a manner similar to that of Example 27.

(Coating Liquid Formulation)

| | |
|---|---|
| 25 wt. % Aqueous PAA solution | 250 g |
| 28 wt. % Aqueous ammonia solution | 315 g |
| Zinc oxide | 105 g |
| Ammonium carbonate | 200 g |
| Distilled water | 130 g |
| Total | 1,000 g |

In the above coating liquid, the amounts of ammonia and zinc oxide are 400 mol % (4 eq) and 150 mol % (3 eq), respectively, on the basis of the total amount of carboxyl groups contained in the PAA, and the PAA concentration is 6.3 wt. %. Excessive zinc oxide with respect to PAA, together with the added ammonium carbonate, formed a zinc ammonium carbonate complex, and the complex dissolved in the coating liquid, whereby the coating liquid became a transparent, uniform solution.

Example 29

The procedure of Example 15 was repeated, except that the PAA zinc salt formation conditions (temperature: 50° C., relative humidity: 20%, 24 hours) were replaced by the below-described conditions, to thereby produce a laminate. The laminate was subjected to evaluation in a manner similar to that of Example 15. In this Example, the PET/(PAA+ZnO+ ammonia serving as a volatile base) laminate was allowed to stand for two hours in a thermostatic/humidistatic chamber in which the temperature and relative humidity were controlled to 60° C. and 80%, respectively.

Example 30

The procedure of Example 15 was repeated, except that the PAA zinc salt formation conditions (temperature: 50° C., relative humidity: 20%, 24 hours) were replaced by the below-described conditions, to thereby produce a laminate. The laminate was subjected to evaluation in a manner similar to that of Example 15. In this Example, the PET/(PAA+ZnO+ ammonia serving as a volatile base) laminate was allowed to stand for one hour in a thermostatic/humidistatic chamber in which the temperature and relative humidity were controlled to 90° C. and 80%, respectively.

Example 31

The procedure of Example 15 was repeated, except that the PAA zinc salt formation conditions (temperature: 50° C., relative humidity: 20%, 24 hours) were replaced by the below-described conditions, to thereby produce a laminate. The laminate was subjected to evaluation in a manner similar to that of Example 15. In this Example, the PET/(PAA+ZnO+ ammonia serving as a volatile base) laminate was treated with steam by use of an autoclave at 120° C. and 1 kg/cm$^2$ for 15 minutes. Before the steam treatment, the laminate was vacuum-packaged in a pouch formed from a commercially available unstretched polypropylene film (CPP) for the purpose of protection of the laminate. The polypropylene film pouch sufficiently enabled water vapor to penetrate into the pouch under high temperature and pressure, to thereby form a PAA zinc salt through solid-phase reaction between the PAA and the polyvalent metal compound contained in the PAA.

Example 32

A coating liquid similar to that employed in Example 15 was spread onto a glass plate (20 cm×20 cm), followed by drying for 24 hours in an oven whose temperature was controlled to 50° C. After completion of drying, a transparent, uniform single-layer film (thickness: 100 μm) was formed on the glass plate. The thus-formed single-layer film was removed from the glass plate, and then allowed to stand for 24 hours in a thermostatic/humidistatic chamber in which the temperature and relative humidity were controlled to 50° C.

and 20%, respectively. Similar to the cases of the laminates of the above-described Examples, the single-layer film was subjected to evaluation in a manner similar to that of Example 15.

Comparative Example 3

The polyacrylic acid (Aron™ A-10H) employed in Example 15 was replaced by a polycarboxylic acid-acrylic acid ester copolymer (Aron™ A-7050, product of Toagosei Co., Ltd., alkali-soluble emulsion, solid content: 40 wt. %), to thereby prepare a coating liquid having the below-described formulation, and a laminate was produced from the coating liquid. The laminate was subjected to evaluation in a manner similar to that of Example 15.

(Coating Liquid Formulation)

| | |
|---|---|
| Polycarboxylic acid-acrylic acid ester copolymer emulsion | 125 g |
| 28 wt. % Aqueous ammonia solution | 100 g |
| Zinc oxide | 14 g |
| Distilled water | 761 g |
| Total | 1,000 g |

The amount of an unsaturated carboxylic acid monomer contained in the commercially available polycarboxylic acid-acrylic acid ester copolymer is about 50 mol %. The amounts of ammonia and zinc oxide are about 400 mol % (4 eq) and 50 mol % (1 eq), respectively, on the basis of the total amount of carboxyl groups contained in the monomer. The coating liquid was in the form of a transparent, uniform aqueous solution.

Table 3 shows the results of evaluation of the laminates of Examples 15 through 32 and Comparative Example 3.

As is clear from Table 3, the laminate of the present invention (i.e., each of the laminates of Examples 15 through 32) exhibits excellent oxygen gas-barrier properties, stability to neutral water, and solubility in an acid and an alkali. In contrast, in the case of Comparative Example 3, in which the poly(carboxylic acid) polymer employed in the Examples is replaced by a poly(carboxylic acid) polymer—a film formed solely from the polymer exhibits an oxygen permeation coefficient of 1,000 cm$^3$(STP)·μm/(m$^2$·day·MPa) or more as measured at 30° C. and a relative humidity of 0%—the laminate exhibits unsatisfactory oxygen gas-barrier properties.

Examples 33 through 41 describe laminates according to the fifteenth and twenty-fourth inventions, packaging bags according to the thirty-ninth and forty-third inventions, and packaging materials for thermal sterilization according to the fortieth and forty-fourth inventions. These Examples describe (1) a process for producing a laminate including a substrate, and a film formed from a poly(carboxylic acid) polymer and a polyvalent metal compound, the film being provided on the substrate; (2) a process for producing a laminate including the laminate; and (3) use of the laminate. In Examples 33 through 43, different plastic substrates were employed as a support for forming a film predominantly containing a poly(carboxylic acid) polymer and a polyvalent metal compound. Examples 42 and 43 describe (1) a process for producing a laminate including a substrate, and a film formed from a poly(carboxylic acid) polymer, a polyvalent metal compound, and a volatile base, the film being provided on the substrate; (2) a process for producing a laminate including the laminate; and (3) use of the laminate. In Examples 42 and 43, different plastic substrates were employed as a support.

Example 33

Firstly, coating liquids 1, 2, and 3 having the below-described formulations were prepared. The coating liquid 1 is an

TABLE 3

| No. | Poly(carboxylic acid) polymer | Polyvalent metal compound/amount (eq) on the basis of carboxyl groups of PAA/volatile base | Film thickness (μm) | Solubility in acid or alkali | | | Ionization degree | Peak ratio *1 | Oxygen permeability *2 | Oxygen permeation coefficient *3 |
|---|---|---|---|---|---|---|---|---|---|---|
| | | | | Acid | Neutral | Alkali | | | | |
| Ex. 15 | PAA | ZnO/1/ammonia | 1.0 | Soluble | Insoluble | Soluble | 0.9 | 9.0 | 1 | 1 |
| Ex. 16 | PAA | ZnO/0.5/ammonia | 1.0 | Soluble | Insoluble | Soluble | 0.5 | 1.0 | 200 | 200 |
| Ex. 17 | PAA | ZnO/2.0/ammonia | 1.0 | Soluble | Insoluble | Soluble | 0.9 | 9.0 | 1 | 1 |
| Ex. 18 | PAA | CuO/1/ammonia | 1.0 | Soluble | Insoluble | Soluble | 0.9 | 9.0 | 1 | 1 |
| Ex. 19 | PAA | NiO/1/ammonia | 1.0 | Soluble | Insoluble | Soluble | 0.9 | 9.0 | 1 | 1 |
| Ex. 20 | PAA | CoO/1/ammonia | 1.0 | Soluble | Insoluble | Soluble | 0.9 | 9.0 | 1 | 1 |
| Ex. 21 | PAA | MgO/1/ammonia | 1.0 | Soluble | Insoluble | Soluble | 0.9 | 9.0 | 100 | 100 |
| Ex. 22 | PAA | CaCO$_3$/1/ammonia | 1.0 | Soluble | Insoluble | Soluble | 0.9 | 9.0 | 100 | 100 |
| Ex. 23 | Partially neutralized PAA | ZnO/0.8/ammoia | 1.0 | Soluble | Insoluble | Soluble | 0.9 | 9.0 | 10 | 10 |
| Ex. 24 | PAA | ZnO/1/monomethylamine | 1.0 | Soluble | Insoluble | Soluble | 0.9 | 9.0 | 10 | 10 |
| Ex. 25 | PAA | CuO + ZnO/0.5 + 0.5/ammonia | 1.0 | Soluble | Insoluble | Soluble | 0.9 | 9.0 | 1 | 1 |
| Ex. 26 | PAA | MgO + ZnO/0.5 + 0.5/ammonia | 1.0 | Soluble | Insoluble | Soluble | 0.9 | 9.0 | 10 | 10 |
| Ex. 27 | PAA | ZnO/2/ammonia + ammonium carbonate | 1.0 | Soluble | Insoluble | Soluble | 0.9 | 9.0 | 1 | 1 |
| Ex. 28 | PAA | ZnO/3/ammonia + ammonium carbonate | 1.0 | Soluble | Insoluble | Soluble | 0.9 | 9.0 | 1 | 1 |
| Ex. 29 | PAA | ZnO/1/ammonia | 1.0 | Soluble | Insoluble | Soluble | 0.9 | 9.0 | 1 | 1 |
| Ex. 30 | PAA | ZnO/1/ammonia | 1.0 | | | | 0.9 | 9.0 | 1 | 1 |
| Ex. 31 | PAA | ZnO/1/ammonia | 1.0 | | | | 0.9 | 9.0 | 1 | 1 |
| Ex. 32 | PAA | ZnO/1/ammonia | 100 | | | | 0.9 | 9.0 | 1 | 100 |
| Comp. Ex. 3 | Polycarboxylic acid-acrylic acid ester copolymer | ZnO/1/ammonia | 1.0 | Insoluble | Insoluble | Soluble | 0.9 | 9.0 | 1400 | 1400 |

*Oxygen permeability of PET film serving as a substrate: 1,400 cm$^3$(STP)/m$^2$ · day · MPa (30° C., 80% RH)
*1: $A_{1560}/A_{1700}$
*2: (unit) cm$^3$(STP)/m$^2$ · day · MPa (30° C., 80% RH) (oxygen permeability)
*3: (unit) cm$^3$(STP) · μm/m$^2$ · day · MPa (30° C., 80% RH) (oxygen permeation coefficient)

anchor coating (hereinafter abbreviated as "AC") liquid for enhancing adhesion between a substrate and a poly(carboxylic acid) polymer layer. The coating liquid 2 is a polyacrylic acid coating liquid serving as a poly(carboxylic acid) polymer, and the coating liquid 3 is a zinc-oxide-containing resin coating liquid for providing zinc oxide fine particles on a polyacrylic acid layer. Coating liquid 1: adhesive for dry laminating and anchor coating: Dicdry™ LX-747A (product of Dainippon Ink and Chemicals, Inc.), curing agent: KX-75, solvent: ethyl acetate (Formulation)

| LX-747A | 10 kg |
|---|---|
| KX-75 | 1.5 kg |
| Ethyl acetate | 18.5 kg |
| Total | 30 kg |

Coating liquid 2: polyacrylic acid: Aron™ A-10H (product of Toagosei Co., Ltd.), solvent: water and isopropyl alcohol (Formulation)

| Aron ™ A-10H (25% aqueous solution) | 10 kg |
|---|---|
| Isopropyl alcohol | 38 kg |
| Water | 2 kg |
| Total | 50 kg |

Coating liquid 3: coating material containing zinc oxide ultrafine particles: ZR133 (product of Sumitomo Osaka Cement Co., Ltd., non-volatile content: 33 wt. % (zinc oxide ultrafine particles: 18 wt. %), curing agent: isocyanate prepolymer DN980 (product of Dainippon Ink and Chemicals, Inc.), solvent: toluene and methyl ethyl ketone (Formulation)

| ZR133 | 30 kg |
|---|---|
| DN980 | 3 kg |
| Total | 33 kg |

By use of a multi-color gravure printing machine, the aforementioned coating liquids 1, 2, and 3 were sequentially applied onto a biaxially stretched polyethylene terephthalate film (PET: Lumirror™ P60, product of Toray Industries, Inc., thickness: 12 µm, one side corona treated, percent thermal shrinkage through immersion in hot water at 90° C. for 30 seconds: 0.5%) serving as a substrate, followed by drying, to thereby yield a laminate including PET/AC (0.3 g/m$^2$)/PAA (0.5 g/m$^2$, 0.4 µm)/ZnO (1 g/m$^2$, 0.8 µm, as reduced to ZnO) (note: the values shown in parentheses represent the dry coating amounts of the respective layers). In order to impart heat sealability to the laminate, an unstretched polypropylene film (CPP: Aromer™ ET-20, product of Showa Denko K.K., thickness: 60 µm) was dry-laminated on the ZnO-coated surface by use of a dry laminator and Dicdry™ LX-747A (product of Dainippon Ink and Chemicals, Inc.) serving as an adhesive for dry laminating (hereinafter abbreviated as "AD"), to thereby produce a laminate having the following structure: PET/AC/PAA/ZnO/AD/CPP. Portions of the CPP surface of the thus-produced laminate were attached together by use of an impulse sealer, to thereby form a bag. The bag was filled with water (200 g), to thereby prepare a water-filled pouch having dimensions of 25 cm×15 cm. The water-filled pouch was subjected to the following three treatments: (1) the pouch was allowed to stand for 24 hours in an oven whose temperature was controlled to 30° C.; (2) the pouch was immersed in water of 90° C. for one hour; and (3) the pouch was pressurized and heated at 120° C. and 2.5 kg/cm$^2$ for 30 minutes by use of an autoclave which is employed for food retorting. These treatments were performed in consideration of the case where the above-formed bag is employed for packaging a food having a high water content, or the bag is subjected to boiling or retorting. After completion of these treatments, the oxygen permeability of the laminate was measured.

Example 34

The procedure of Example 33 was repeated, except that the PET film was replaced by a biaxially stretched nylon 6 film (ONy: Emblem™ ONBC, product of Unitika Ltd., thickness: 15 µm, both side corona treated, percent thermal shrinkage through immersion in hot water at 90° C. for 30 seconds: 2%), to thereby produce a laminate. The laminate was subjected to treatment and evaluation in a manner similar to that of Example 33.

Example 35

The procedure of Example 33 was repeated, except that the PET film was replaced by a biaxially stretched polypropylene film (OPP: Torayfan™ BO, product of Toray Industries, Inc., thickness: 20 µm, one side corona treated, percent thermal shrinkage through immersion in hot water at 90° C. for 30 seconds: 2%), to thereby produce a laminate. The laminate was subjected to treatment and evaluation in a manner similar to that of Example 33.

Example 36

The procedure of Example 33 was repeated, except that the PET film was replaced by an unstretched polypropylene film (CPP: Torayfan™ NO ZK93K, product of Toray Plastic Films Co., Ltd., thickness: 60 µm), to thereby produce a laminate. The laminate was subjected to treatment and evaluation in a manner similar to that of Example 33.

Example 37

The procedure of Example 33 was repeated, except that the PET film was replaced by an unstretched polyethylene film (LLDPE: TUX™ TCS, product of Tohcello Co., Ltd., thickness: 50 µm), to thereby produce a laminate. The laminate was subjected to treatment and evaluation in a manner similar to that of Example 33.

Example 38

The procedure of Example 33 was repeated, except that the PET film was replaced by an unstretched nylon film (CNy:

Rayfan™ NO1401, product of Toray Plastic Films Co., Ltd., thickness: 50 μm, one side corona treated), to thereby produce a laminate. The laminate was subjected to treatment and evaluation in a manner similar to that of Example 33.

Example 39

The procedure of Example 33 was repeated, except that the PET film was replaced by an aluminum-deposited PET film (Alvm PET: Teto-Light™ ATAV, product of Oike Industrial Co., Ltd., thickness: 12 μm), to thereby produce a laminate. The laminate was subjected to treatment and evaluation in a manner similar to that of Example 33. The coating liquids 1, 2, and 3 were applied onto the aluminum-deposited surface.

Example 40

The procedure of Example 33 was repeated, except that the PET film was replaced by a transparent, silicon-oxide-deposited PET film ($SiO_x$vm PET: MOS™ TR, product of Oike Industrial Co., Ltd., thickness: 12 μm), to thereby produce a laminate. The laminate was subjected to treatment and evaluation in a manner similar to that of Example 33. The coating liquids 1, 2, and 3 were applied onto the silicon-oxide-deposited surface.

Example 41

The procedure of Example 33 was repeated, except that the PET film was replaced by a transparent, aluminum-oxide-deposited PET film ($Al_2O_3$vm PET: BARRIALOX™ VM-PET1011, product of Toyo Metallizing Co., Ltd., thickness: 12 μm), to thereby produce a laminate. The laminate was subjected to treatment and evaluation in a manner similar to that of Example 33. The coating liquids 1, 2, and 3 were applied onto the aluminum-oxide-deposited surface.

Example 42

The below-described coating liquid 4 was employed in place of the coating liquids 1, 2, and 3 employed in Example 33.

Coating Liquid 4 (Formulation)

| | |
|---|---|
| Aron ™ A-10H (25 wt. % aqueous PAA solution) | 25 kg |
| 28 wt. % Aqueous ammonia solution | 21 kg |
| Zinc oxide | 3.5 kg |
| Water | 50.5 kg |
| Total | 100 kg |

The coating liquid 4 was applied, by use of a die coater, onto a biaxially stretched polyethylene terephthalate (PET) film (serving as a substrate) similar to that employed in Example 33, followed by drying, to thereby yield a laminate. The dry coating amount of the coating liquid 4 was found to be 0.5 $g/m^2$ (0.4 μm). In a manner similar to that of Example 33, CPP was laminated on the above-coated surface of the laminate to thereby produce a laminate, and the laminate was subjected to treatment and evaluation.

Example 43

The procedure of Example 42 was repeated, except that the PET film was replaced by a biaxially stretched nylon 6 film (ONy: Emblem™ ONBC, product of Unitika Ltd., thickness: 15 μm, both side corona treated), to thereby produce a laminate. The laminate was subjected to treatment and evaluation in a manner similar to that of Example 42.

Table 4 shows the results of evaluation of the laminates of Examples 33 through 43.

TABLE 4

| No. | Laminate structure | Total thickness of PAA + ZnO coating layer (μm) | Chemical equivalent of polyvalent metal compound | Oxygen permeability (oxygen permeation coefficient) after treatment $cm^3(STP)/m^2 \cdot day \cdot MPa$, 30° C., 80% RH ($cm^3(STP) \cdot \mu m/m^2 \cdot day \cdot MPa$, 30° C., 80% RH) | | | Peak ratio ($A_{1560}/A_{1700}$) | | |
|---|---|---|---|---|---|---|---|---|---|
| | | | | Treatment 1* | Treatment 2* | Treatment 3* | Treatment 1 | Treatment 2 | Treatment 3 |
| Ex. 33 | PET/AC/PAA/ZnO/AD/CPP | 1.2 | 3.6 | 10 (12) | 1 (1.2) | 1 (1.2) | 4 | 9 | 9 |
| Ex. 34 | ONy/AC/PAA/ZnO/AD/CPP | 1.2 | 3.6 | 10 (12) | 1 (1.2) | 1 (1.2) | 4 | 9 | 9 |
| Ex. 35 | OPP/AC/PAA/ZnO/AD/CPP | 1.2 | 3.6 | 50 (60) | 1 (1.2) | 1 (1.2) | 4 | 9 | 9 |
| Ex. 36 | CPP/AC/PAA/ZnO/AD/CPP | 1.2 | 3.6 | 50 (60) | 1 (1.2) | 1 (1.2) | 4 | 9 | 9 |
| Ex. 37 | LLDPE/AC/PAA/ZnO/AD/CPP | 1.2 | 3.6 | 50 (60) | 1 (1.2) | 1 (1.2) | 4 | 9 | 9 |
| Ex. 38 | CNy/AC/PAA/ZnO/AD/CPP | 1.2 | 3.6 | 10 (12) | 1 (1.2) | 1 (1.2) | 4 | 9 | 9 |
| Ex. 39 | PET(Alvm)/AC/PAA/ZnO/AD/CPP | 1.2 | 3.6 | 0.1 (0.12) | 0.1 (0.12) | 0.1 (0.12) | 4 | 9 | 9 |
| Ex. 40 | PET(SiOxvm)/AC/PAA/ZnO/AD/CPP | 1.2 | 3.6 | 0.1 (0.12) | 0.1 (0.12) | 0.1 (0.12) | 4 | 9 | 9 |
| Ex. 41 | PET($Al_2O_3$vm)/AC/PAA/ZnO/AD/CPP | 1.2 | 3.6 | 0.1 (0.12) | 0.1 (0.12) | 0.1 (0.12) | 4 | 9 | 9 |
| Ex. 42 | PET/PAA + ZnO + ammonia/AD/CPP | 0.4 | 1 | 1 (1.2) | 1 (1.2) | 1 (1.2) | 9 | 9 | 9 |
| Ex. 43 | ONy/PAA + ZnO + ammonia/AD/CPP | 0.4 | 1 | 1 (1.2) | 1 (1.2) | 1 (1.2) | 9 | 9 | 9 |

(*) Treatment 1: Storage of water-filled pouch at 30° C. for 24 hours
  Treatment 2: Boiling treatment of water-filled pouch in water of 90° C. for one hour
  Treatment 3: Retorting treatment of water-filled pouch at 120° C. for 30 minutes by use of a high-temperature, high-pressure autoclave
Oxygen permeability of PET film serving as a substrate: 1,400 $cm^3(STP)/m^2 \cdot day \cdot MPa$ (30° C., 80% RH)

As is clear from Table 4, the pouch formed from the laminate including the laminate of the present invention exhibits excellent oxygen gas-barrier properties even when undergoes treatments performed in consideration of the case where the pouch is employed for food storage or is subjected to retorting in high-temperature water vapor or hot water.

Examples 44 through 52 describe films according to the third and nineteenth inventions which have been described in the section "Disclosure of the Invention," and laminates including the films.

These Examples describe (1) a process for preparing a film including a substrate and, on the substrate, a layer (a) formed of a poly(carboxylic acid) polymer and a layer (b) formed of a polyvalent metal compound, in which the layers (a) and (b) are arranged in the following order: layer (b)/layer (a)/layer (b); (2) a process for producing a laminate including the film; and (3) use of the laminate. In Examples 44 through 52, different plastic substrates were employed as a support for forming a film predominantly containing a poly(carboxylic acid) polymer and a polyvalent metal compound.

Example 44

Coating liquids 1 and 2 having the below-described formulations were prepared. The coating liquid 1 is a polyacrylic acid coating liquid serving as a poly(carboxylic acid) polymer, and the coating liquid 2 is a zinc-oxide-containing resin coating liquid for providing zinc oxide fine particles on a polyacrylic acid layer.

Coating liquid 1: polyacrylic acid (Aron™ A-10H, product of Toagosei Co., Ltd.), solvent: water and isopropyl alcohol
(Formulation)

| | |
|---|---|
| Aron ™ A-10H (25% aqueous solution) | 10 kg |
| Isopropyl alcohol | 38 kg |
| Water | 2 kg |
| Total | 50 kg |

Coating liquid 2: coating material containing zinc oxide ultrafine particles (ZR133, product of Sumitomo Osaka Cement Co., Ltd., non-volatile content: 33 wt. % (zinc oxide ultrafine particles: 18 wt. %)), curing agent (isocyanate prepolymer DN980, product of Dainippon Ink and Chemicals, Inc.), solvent (toluene and methyl ethyl ketone)
(Formulation)

| | |
|---|---|
| ZR133 | 30 kg |
| DN980 | 3 kg |
| Total | 33 kg |

By use of a multi-color gravure printing machine, the coating liquid 2, the coating liquid 1, and the coating liquid 2 were sequentially applied onto the surface of a biaxially stretched polyethylene terephthalate film (serving as a substrate) similar to that employed in Example 33, followed by drying, to thereby yield a laminate including PET/ZnO (0.5 g/m$^2$, 0.25 µm, as reduced to ZnO)/PAA (0.5 g/m$^2$, 0.4 µm)/ZnO (0.5 g/m$^2$, 0.25 µm, as reduced to ZnO) (note: the values shown in parentheses represent the dry coating amounts of the respective layers). In order to impart heat sealability to the laminate, an unstretched polypropylene film (CPP: Aromer™ ET-20, product of Showa Denko K.K., thickness: 60 µm) was dry-laminated on the ZnO-coated surface by use of a dry laminator and Dicdry™ LX-747A (product of Dainippon Ink and Chemicals, Inc.) serving as an adhesive for dry laminating (hereinafter abbreviated as "AD"), to thereby produce a laminate having the following structure: PET/ZnO/PAA/ZnO/AD/CPP. Portions of the CPP surface of the thus-produced laminate were attached together by use of an impulse sealer, to thereby form a bag. The bag was filled with water (200 g), to thereby prepare a water-filled pouch having dimensions of 25 cm×15 cm. The water-filled pouch was subjected to the following three treatments: (1) the pouch was allowed to stand for 24 hours in an oven whose temperature was controlled to 30° C.; (2) the pouch was immersed in water of 90° C. for one hour; and (3) the pouch was pressurized and heated at 120° C. and 2.5 kg/cm$^2$ for 30 minutes by use of an autoclave which is employed for food retorting. These treatments were performed in consideration of the case where the above-formed bag is employed for packaging a food having a high water content, or the bag is subjected to boiling or retorting. After completion of these treatments, the oxygen permeability of the laminate was measured.

Example 45

The procedure of Example 44 was repeated, except that the PET film was replaced by a biaxially stretched nylon 6 film (abbreviated as "ONy") (Emblem™ ONBC, product of Unitika Ltd., thickness: 15 µm, both side corona treated, percent thermal shrinkage through immersion in hot water at 90° C. for 30 seconds: 2%), to thereby produce a laminate. The laminate was subjected to treatment and evaluation in a manner similar to that of Example 44.

Example 46

The procedure of Example 44 was repeated, except that the PET film was replaced by a biaxially stretched polypropylene film (abbreviated as "OPP") (Torayfan™ BO, product of Toray Industries, Inc., thickness: 20 µm, one side corona treated, percent thermal shrinkage through immersion in hot water at 90° C. for 30 seconds: 2%), to thereby produce a laminate. The laminate was subjected to treatment and evaluation in a manner similar to that of Example 44.

Example 47

The procedure of Example 44 was repeated, except that the PET film was replaced by an unstretched polypropylene film (CPP) (Torayfan™ NO ZK93K, product of Toray Industries, Inc., thickness: 60 µm), to thereby produce a laminate. The laminate was subjected to treatment and evaluation in a manner similar to that of Example 44.

Example 48

The procedure of Example 44 was repeated, except that the PET film was replaced by an unstretched polyethylene film (LLDPE) (TUX™ TCS, product of Tohcello Co., Ltd., thickness: 50 µm), to thereby produce a laminate. The laminate was subjected to treatment and evaluation in a manner similar to that of Example 44.

Example 49

The procedure of Example 44 was repeated, except that the PET film was replaced by an unstretched nylon film (CNy) (Rayfan™ NO1401, product of Toray Plastic Films Co., Ltd., thickness: 70 μm, one side corona treated), to thereby produce a laminate. The laminate was subjected to treatment and evaluation in a manner similar to that of Example 44. The coating liquids 1 and 2 were applied onto the corona-treated surface of the nylon film.

Example 50

The procedure of Example 44 was repeated, except that the PET film was replaced by an aluminum-deposited PET film (Alvm PET) (Teto-Light™ ATAV, product of Oike Industrial Co., Ltd., thickness: 12 μm), to thereby produce a laminate. The laminate was subjected to treatment and evaluation in a manner similar to that of Example 44. The coating liquids 1 and 2 were applied onto the aluminum-deposited surface.

Example 51

The procedure of Example 44 was repeated, except that the PET film was replaced by a transparent, silicon-oxide-deposited PET film (SiOxvm PET) (MOS™ TR, product of Oike Industrial Co., Ltd., thickness: 12 μm), to thereby produce a laminate. The laminate was subjected to treatment and evaluation in a manner similar to that of Example 44. The coating liquids 1 and 2 were applied onto the silicon-oxide-posited deposited surface.

Example 52

The procedure of Example 44 was repeated, except that the PET film was replaced by a transparent, aluminum-oxide-deposited PET film ($Al_2O_3$vm PET) (BARIALOX™ VM-PET1011, product of Toyo Metallizing Co., Ltd., thickness: 12 μm), to thereby produce a laminate. The laminate was subjected to treatment and evaluation in a manner similar to that of Example 44. The coating liquids 1 and 2 were applied onto the aluminum-oxide-deposited surface of the PET film. Table 5 shows the results of evaluation of the laminates of Examples 44 through 52.

Examples 53 through 55 describe (1) a process in which a poly(carboxylic acid) polymer is applied onto a substrate, followed by drying, thereby forming a film, and a polyvalent metal compound is applied onto the thus-formed film through vapor deposition, to thereby prepare a laminate including the substrate/the poly(carboxylic acid) polymer/the polyvalent metal compound; and (2) a process in which the resultant laminate is allowed to stand in a water vapor atmosphere, to thereby form a poly(carboxylic acid) polymer polyvalent metal salt through solid-phase reaction.

Example 53

Polyacrylic acid (PAA) (Aron™ A-10H, product of Toagosei Co., Ltd., number average molecular weight: 200,000, 25 wt. % aqueous solution), serving as a poly(carboxylic acid) polymer, was diluted with distilled water, to thereby prepare a 10 wt. % aqueous solution. The thus-prepared aqueous solution was applied onto a stretched polyethylene terephthalate film similar to that employed in Example 1 by use of a bar coater (K303 PROOFER™, product of RK PRINT-COAT INSTRUMENT), followed by drying by use of a drier. The resultant coating film layer was found to have a thickness of 0.1 μm. Subsequently, zinc (metal) was deposited onto the polyacrylic acid coating film layer by use of a bell jar-type vacuum deposition apparatus. The resultant zinc deposition layer was found to have a thickness of 0.05 μm. The thus-obtained laminate was allowed to stand for 24 hours in a thermostatic/humidistatic chamber in which the temperature and relative humidity were regulated to 30° C. and 80%, respectively, so as to form a PAA zinc salt through migration of Zn ions into the PAA layer (solid-phase reaction), thereby producing a laminate including the PAA zinc salt. The resultant laminate was evaluated in terms of ionization degree, peak ratio ($A_{1560}/A_{1700}$) in an infrared absorption spectrum, oxy-

TABLE 5

| No. | Laminate structure | Total thickness of PAA + ZnO coating layer (μm) | Chemical equivalent of polyvalent metal compound | Oxygen permeability (oxygen permeation coefficient) after treatment $cm^3(STP)/m^2 \cdot day \cdot MPa$ (30° C., 80% RH) $cm^3(STP) \cdot \mu m/m^2 \cdot day \cdot MPa$ (30° C., 80% RH) | | | Peak ratio ($A_{1560}/A_{1700}$) | | |
|---|---|---|---|---|---|---|---|---|---|
| | | | | Treatment *1 | Treatment *2 | Treatment *3 | Treatment *1 | Treatment *2 | Treatment *3 |
| Ex. 44 | PET/ZnO/PAA/ZnO/AD/CPP | 0.9 | 3.6 | 5 (4.5) | 1 (0.9) | 1 (0.9) | 4 | 9 | 9 |
| Ex. 45 | ONy/ZnO/PAA/ZnO/AD/CPP | 0.9 | 3.6 | 5 (4.5) | 1 (0.9) | 1 (0.9) | 4 | 9 | 9 |
| Ex. 46 | OPP/ZnO/PAA/ZnO/AD/CPP | 0.9 | 3.6 | 5 (4.5) | 1 (0.9) | 1 (0.9) | 4 | 9 | 9 |
| Ex. 47 | CPP/ZnO/PAA/ZnO/AD/CPP | 0.9 | 3.6 | 5 (4.5) | 1 (0.9) | 1 (0.9) | 4 | 9 | 9 |
| Ex. 48 | LLDPE/ZnO/PAA/ZnO/AD/CPP | 0.9 | 3.6 | 5 (4.5) | 1 (0.9) | 1 (0.9) | 4 | 9 | 9 |
| Ex. 49 | CNy/ZnO/PAA/ZnO/AD/CPP | 0.9 | 3.6 | 5 (4.5) | 1 (0.9) | 1 (0.9) | 4 | 9 | 9 |
| Ex. 50 | PET(Alvm)/ZnO/PAA/ZnO/AD/CPP | 0.9 | 3.6 | 5 (4.5) | 1 (0.9) | 1 (0.9) | 4 | 9 | 9 |
| Ex. 51 | PET(SiOxvm)/ZnO/PAA/ZnO/AD/CPP | 0.9 | 3.6 | 5 (4.5) | 1 (0.9) | 1 (0.9) | 4 | 9 | 9 |
| Ex. 52 | PET($Al_2O_3$vm)/ZnO/PAA/ZnO/AD/CPP | 0.9 | 3.6 | 5 (4.5) | 1 (0.9) | 1 (0.9) | 4 | 9 | 9 |

Treatment *1: Storage of water-filled pouch at 30° C. for 24 hours
Treatment *2: Boiling treatment of water-filled pouch in water of 90° C. for one hour
Treatment *3: Retorting treatment of water-filled pouch at 120° C. for 30 minutes by use of a high-temperature, high-pressure autoclave
*Oxygen permeability of PET film serving as a substrate: 1,400 $cm^3(STP)/m^2 \cdot day \cdot MPa$ (30° C., 80% RH) (Examples 44 through 58 and Reference Examples 1 through 9)

gen permeability, and solubility in an acid or an alkali by means of the above-described methods.

Example 54

The procedure of Example 53 was repeated, except that zinc was replaced by copper (metal), to thereby produce a laminate. The laminate was subjected to evaluation in a manner similar to that of Example 53. The resultant copper deposition layer was found to have a thickness of 0.05 µm.

Example 55

The procedure of Example 53 was repeated, except that zinc was replaced by calcium (metal), to thereby produce a laminate. The laminate was subjected to evaluation in a manner similar to that of Example 53. The resultant calcium deposition layer was found to have a thickness of 0.05 µm. Table 6 shows the results of evaluation of the laminates of Examples 53 through 55.

static/humidistatic chamber in which the temperature and relative humidity were regulated to 30° C. and 80%, respectively.

Reference Example 3

The procedure of Example 7 was repeated, except that the process of applying an aqueous polyacrylic acid solution onto a substrate film was not carried out, to thereby coat a PET film with magnesium methoxide and produce a PET/magnesium methoxide film. In a manner similar to that of Example 1, the thus-produced film was allowed to stand for 24 hours in a thermostatic/humidistatic chamber in which the temperature and relative humidity were regulated to 30° C. and 80%, respectively.

Reference Example 4

The procedure of Example 8 was repeated, except that the process of applying an aqueous polyacrylic acid solution onto

TABLE 6

| No. | I | II | Chemical equivalent of polyvalent metal compound | Thickness of PAA/metal layer (µm) | *1 (° C.) | Solubility in acid or alkali | | | Ionization degree | Peak ratio | Oxygen permeability (oxygen permeation coefficient) cm³(STP)/m² · day · MPa (30° C., 80% RH) cm³(STP) · µm/m² · day · MPa (30° C., 80% RH) |
|---|---|---|---|---|---|---|---|---|---|---|---|
| | | | | | | Acid | Neutral | Alkali | | | |
| Ex. 53 | PAA | Zn deposition | 2.4 | 0.15 | 30 | Soluble | Insoluble | Soluble | 0.8 | 4.0 | 10 (1.5) |
| Ex. 54 | PAA | Cu deposition | 2.4 | 0.15 | 30 | Soluble | Insoluble | Soluble | 0.8 | 4.0 | 10 (1.5) |
| Ex. 55 | PAA | Ca deposition | 2.0 | 0.15 | 30 | Soluble | Insoluble | Soluble | 0.8 | 4.0 | 10 (1.5) |

I: Poly(carboxylic acid) polymer
II: Polyvalent metal compound
III: Oxygen permeability, unit (cm³(STP)/m² · day · MPa) (30° C., 80% RH)
*1: Carboxylic acid salt formation temperature In Reference Examples 1 through 9, which relate to Examples 1 through 14, 33 through 41, and 53 through 55, merely a polyvalent metal compound was applied onto a substrate, and the resultant film was allowed to stand in a water vapor atmosphere, followed by measurement of the oxygen permeability of the film.

Reference Example 1

The procedure of Example 1 was repeated, except that the process of applying an aqueous polyacrylic acid solution onto a substrate film was not carried out, to thereby coat a PET film with ZnO fine particles and produce a PET/ZnO film. In a manner similar to that of Example 1, the thus-produced film was allowed to stand for 24 hours in a thermostatic/humidistatic chamber in which the temperature and relative humidity were regulated to 30° C. and 80%, respectively.

Reference Example 2

The procedure of Example 6 was repeated, except that the process of applying an aqueous polyacrylic acid solution onto a substrate film was not carried out, to thereby coat a PET film with magnesium oxide and produce a PET/magnesium oxide film. In a manner similar to that of Example 1, the thus-produced film was allowed to stand for 24 hours in a thermoa substrate film was not carried out, to thereby coat a PET film with copper oxide and produce a PET/copper oxide film. In a manner similar to that of Example 1, the thus-produced film was allowed to stand for 24 hours in a thermostatic/humidistatic chamber in which the temperature and relative humidity were regulated to 30° C. and 80%, respectively.

Reference Example 5

The procedure of Example 9 was repeated, except that the process of applying an aqueous polyacrylic acid solution onto a substrate film was not carried out, to thereby coat a PET film with calcium carbonate and produce a PET/calcium carbonate film. In a manner similar to that of Example 1, the thus-produced film was allowed to stand for 24 hours in a thermostatic/humidistatic chamber in which the temperature and relative humidity were regulated to 30° C. and 80%, respectively.

Reference Example 6

The procedure of Example 33 was repeated, except that the process of applying an aqueous polyacrylic acid solution onto a substrate film was not carried out, to thereby coat a PET film with a zinc-oxide-containing coating material and produce a PET/AC/ZnO/AD/CPP laminate pouch. In a manner similar to that of Example 33, the thus-produced pouch was filled with water, and then allowed to stand for 24 hours in a thermostatic/humidistatic chamber in which the temperature and relative humidity were regulated to 30° C. and 80%, respectively.

Reference Example 7

The procedure of Example 53 was repeated, except that the process of applying an aqueous polyacrylic acid solution onto a substrate film was not carried out, to thereby deposit zinc (metal) onto a PET film and produce a PET/Zn (metal) film. In a manner similar to that of Example 53, the thus-produced film was allowed to stand for 24 hours in a thermostatic/humidistatic chamber in which the temperature and relative humidity were regulated to 30° C. and 80%, respectively. Zinc contained in the resultant zinc layer underwent corrosion, resulting in discoloration.

Reference Example 8

The procedure of Example 54 was repeated, except that the process of applying an aqueous polyacrylic acid solution onto a substrate film was not carried out, to thereby deposit copper (metal) onto a PET film and produce a PET/copper (metal) film. In a manner similar to that of Example 54, the thus-produced film was allowed to stand for 24 hours in a thermostatic/humidistatic chamber in which the temperature and relative humidity were regulated to 30° C. and 80%, respectively. Copper contained in the resultant copper layer underwent corrosion, resulting in discoloration.

Reference Example 9

The procedure of Example 55 was repeated, except that the process of applying an aqueous polyacrylic acid solution onto a substrate film was not carried out, to thereby deposit calcium (metal) onto a PET film and produce a PET/calcium (metal) film. In a manner similar to that of Example 55, the thus-produced film was allowed to stand for 24 hours in a thermostatic/humidistatic chamber in which the temperature and relative humidity were regulated to 30° C. and 80%, respectively. Calcium contained in the resultant calcium layer lost its metallic luster, resulting in clouding. Table 7 shows the results of evaluation of the films of Reference Examples 1 through 9.

TABLE 7

| No. | I | II | *1 (° C.) | III |
|---|---|---|---|---|
| Ref. Ex. 1 | PET | ZnO | 30 | 1400 |
| Ref. Ex. 2 | PET | MgO | 30 | 1400 |
| Ref. Ex. 3 | PET | Mg methoxide | 30 | 1400 |
| Ref. Ex. 4 | PET | CuO | 30 | 1400 |
| Ref. Ex. 5 | PET | CaCO$_3$ | 30 | 1400 |
| Ref. Ex. 6 | PET | ZnO coating material | 30 | 1400 |
| Ref. Ex. 7 | PET | Zn deposition | 30 | 700 |
| Ref. Ex. 8 | PET | Cu deposition | 30 | 300 |
| Ref. Ex. 9 | PET | Ca deposition | 30 | 1400 |

I: Poly(carboxylic acid) polymer
II: Polyvalent metal compound
III: Oxygen permeability, unit (cm$^3$(STP)/m$^2$ · day · MPa) (30° C., 80% RH)
*1: Carboxylic acid salt formation temperature Example 56

Polyacrylic acid (PAA) (Aron™ A-10H, product of Toagosei Co., Ltd., number average molecular weight: 200,000, 25 wt. % aqueous solution), serving as a poly(carboxylic acid) polymer, was diluted with distilled water, to thereby prepare a 10 wt. % aqueous solution. The thus-prepared aqueous solution was applied onto a stretched polyethylene terephthalate film (PET film) similar to that employed in Example 1 by use of a bar coater (K303 PROOFER™, product of RK PRINT-COAT INSTRUMENT), followed by drying by use of a drier. The resultant coating film layer was found to have a thickness of 1.0 μm. Subsequently, 10 wt. % aqueous calcium lactate solution was applied onto the coating film by use of the aforementioned bar coater, followed by drying, to thereby yield a PET/PAA/calcium lactate laminate. The dry coating amount of calcium lactate was found to be 2 g/m$^2$ (1 μm). The thus-obtained laminate was allowed to stand for 24 hours in a thermostatic/humidistatic chamber in which the temperature and relative humidity were regulated to 30° C. and 80%, respectively, so as to form a PAA calcium salt through migration of Ca ions into the PAA layer (solid-phase reaction), thereby producing a laminate including the PAA calcium salt. The resultant laminate was evaluated in terms of ionization degree, peak ratio ($A_{1560}/A_{1700}$) in an infrared absorption spectrum, oxygen permeability, and solubility in an acid or an alkali by means of the above-described methods.

Example 57

The procedure of Example 56 was repeated, except that the 10 wt. % aqueous calcium lactate solution was replaced by 10 wt. % aqueous zinc lactate solution, to thereby yield a PET/PAA/zinc lactate laminate. The dry coating amount of zinc lactate was found to be 2 g/m$^2$ (1 μm). The thus-obtained laminate was allowed to stand for 24 hours in a thermostatic/humidistatic chamber in which the temperature and relative humidity were regulated to 30° C. and 80%, respectively, so as to form a PAA zinc salt through migration of Zn ions into the PAA layer (solid-phase reaction), thereby producing a laminate including the PAA zinc salt. The resultant laminate was evaluated in terms of ionization degree, peak ratio ($A_{1560}/A_{1700}$) in an infrared absorption spectrum, oxygen permeability, and solubility in an acid or an alkali by means of the above-described methods.

Example 58

The procedure of Example 56 was repeated, except that the 10 wt. % aqueous calcium lactate solution was replaced by 10 wt. % aqueous calcium acrylate solution, to thereby yield a PET/PAA/calcium acrylate laminate. The dry coating amount of calcium acrylate was found to be 2 g/m$^2$ (1 μm). The thus-obtained laminate was allowed to stand for 24 hours in a thermostatic/humidistatic chamber in which the temperature and relative humidity were regulated to 30° C. and 80%, respectively, so as to form a PAA calcium salt through migration of Ca ions into the PAA layer (solid-phase reaction), thereby producing a laminate including the PAA calcium salt. The resultant laminate was evaluated in terms of ionization degree, peak ratio ($A_{1560}/A_{1700}$) in an infrared absorption spectrum, oxygen permeability, and solubility in an acid or an alkali by means of the above-described methods.

Table 8 shows the results of evaluation of the laminates of Examples 56 through 58.

TABLE 8

| No. | I | II | *1 (°C.) | Total thickness of PAA layer and polyvalent metal compound layer (µm) | Chemical equivalent of polyvalent metal compound | Solubility in acid or alkali | | | Ionization degree | Peak ratio | Oxygen permeability (oxygen permeation coefficient) $cm^3(STP)/m^2 \cdot day \cdot MPa$ (30° C., 80% RH) $cm^3(STP) \cdot \mu m/m^2 \cdot day \cdot MPa$ (30° C., 80% RH) |
|---|---|---|---|---|---|---|---|---|---|---|---|
| | | | | | | Acid | Neutral | Alkali | | | |
| Ex. 56 | PAA | Calac. | 30 | 2 | 0.94 | Soluble | Insoluble | Soluble | 0.8 | 4.0 | 10 (20) |
| Ex. 57 | PAA | Znlac. | 30 | 2 | 0.86 | Soluble | Insoluble | Soluble | 0.8 | 4.0 | 10 (20) |
| Ex. 58 | PAA | CaAc. | 30 | 2 | 1.1 | Soluble | Insoluble | Soluble | 0.8 | 4.0 | 10 (20) |

I: Poly(carboxylic acid) polymer
II: Polyvalent metal compound: Calac.: calcium lactate, Znlac.: zinc lactate, ZnAc.: calcium acrylate
III: Oxygen permeability, unit ($cm^3(STP)/m^2 \cdot day \cdot MPa$) (30° C., 80% RH)
*1: Carboxylic acid salt formation temperature

INDUSTRIAL APPLICABILITY

The present invention provides a film which comprises a poly(carboxylic acid) polymer and a polyvalent metal compound, which exhibits excellent gas (e.g., oxygen)-barrier properties, and which has resistance such that the appearance, shape, and gas-barrier properties are not impaired by neutral water, high-temperature water vapor, or hot water; a laminate comprising the film; and a method for readily producing the film or the laminate on an industrial scale at low cost. The film or laminate of the present invention is suitable for use as a packaging material, packaging container, or vacuum heat-insulating material for articles which are readily impaired by, for example, oxygen, including foods, beverages, chemicals, drugs, and precision metallic parts such as electronic parts. In addition, the film or laminate is suitable for use as a packaging material for articles which require long-term reliable gas-barrier properties, and require treatment (e.g., boiling or retort sterilization) in high-temperature hot water. Meanwhile, the film of the present invention is easily dissolved in an acid or an alkali under specific conditions, and exhibits good disposability; i.e., separation/recovery of the film can be readily carried out upon disposal thereof. Therefore, among the aforementioned uses of the film, the film is particularly suitable for use in the field where a packaging material must be separated/recovered.

The invention claimed is:

1. A film which consists essentially of a polyvalent metal salt of a carboxylic acid which is the reaction product of carboxyl groups of a poly(carboxylic acid) polymer (A) with a polyvalent metal compound (B), wherein the poly(carboxylic acid) polymer (A) is a homopolymer of an α,β-monoethylenically unsaturated carboxylic acid or copolymer of at least two types of α,β-monoethylenically unsaturated carboxylic acids or a mixture of at least two such polymers, wherein said α,β-monoethylenically unsaturated carboxylic acid is selected from the group consisting of acrylic acid, methacrylic acid, itaconic acid, maleic acid, fumaric acid and crotonic acid, wherein the film exhibits a peak ratio ($A_{1560}/A_{1700}$) of a height $A_{1560}$ of an absorption peak at a wave number of 1560 $cm^{-1}$ to a height $A_{1700}$ of an absorption peak at a wave number of 1700 $cm^{-1}$ as determined by infrared absorption spectrum of the film which is at least 0.25, and wherein the film is soluble in a 1 N aqueous hydrochloric acid solution and/or a 1 N aqueous sodium hydroxide solution at room temperature for 24 hours.

2. The film according to claim 1, wherein the film is the result of a precursor film consisting essentially of said poly(carboxylic acid) polymer (A) and said polyvalent metal compound (B) having a precursor peak ratio ($A_{1560}/A_{1700}$) of less than 0.25 being exposed to an atmosphere having a relative humidity of at least 20% for a time sufficient to form the polyvalent metal salt of a carboxylic acid by a reaction of the carboxyl groups of the poly(carboxylic acid) polymer (A) with the polyvalent metal compound (B) to achieve the peak ratio ($A_{1560}/A_{1700}$) of at least 0.25.

3. The film according to claim 2, wherein the film consists essentially of a film layer formed of a mixture of the poly(carboxylic acid) polymer (A) and the polyvalent metal compound (B).

4. The film according to claim 3, wherein the film layer formed of a mixture of the poly(carboxylic acid) polymer (A) and the polyvalent metal compound (B) is in a proportion such that a chemical equivalent of the polyvalent metal compound (B) to the carboxyl groups contained in the poly(carboxylic acid) polymer (A) is at least 0.2.

5. The film according to claim 2, wherein the film consists essentially of multiple layers, and wherein one of the layers (a) is formed from the poly(carboxylic acid) polymer (A) and wherein another layer (b) is formed from the polyvalent metal compound (B) and adjoins the layer (a).

6. The film according to claim 3, wherein one layer (a) formed from the poly(carboxylic acid) polymer (A) and another layer (b) formed from the polyvalent metal compound (B) are alternately and adjoiningly arranged in order of (a)/(b), (b)/(a)/(b) or (a)/(b)/(a).

7. The film according to claim 3, wherein a chemical equivalent of the total (Bt) of the whole polyvalent metal compound (B) to the total (At) of carboxyl groups contained in the poly(carboxylic acid) polymer (A) based on all adjoining layers (a) and (b) is at least 0.2.

8. The film according to claim 1, wherein the poly(carboxylic acid) polymer (A) prior to reaction with the polyvalent metal compound (B) exhibits an oxygen permeation coefficient of at most 1,000 $cm^3$ (STP)·µm/($m^2$·day·MPa) as measured through a film formed solely of the poly(carboxylic acid) polymer (A) under dry conditions of a temperature of 30° C. and a relative humidity of 0%.

9. The film according to claim 1, wherein the polyvalent metal compound (B) is a divalent metal compound.

10. The film according to claim 1, which has a thickness of 0.001 µm to 1 mm.

11. The film according to claim 1, which exhibits an oxygen permeation coefficient of at most 1,000 $cm^3$ (STP)·µm/($m^2$·day·MPa) as measured at a temperature of 30° C. and a relative humidity of 80%.

12. A packaging material formed from the film according to claim 1.

13. The packaging material according to claim 12, which is in the form of a bag, a sheet, a container or packaging material for heat sterilization.

14. A laminate comprising a support, and a film according to claim 1 on the support.

15. A laminate comprising a film according to claim 1 which has a plastic sheet or film coating on at least one side thereof.

16. A packaging material formed from the laminate according to claim 15.

17. The packaging material according to claim 16, which is in the form of a bag, a sheet, a container or a packaging material for heat sterilization.

18. A process for forming a film according to claim 1, the process comprising
(1) forming a precursor film layer which consists essentially of a poly(carboxylic acid) polymer (A), and a polyvalent metal compound (B), wherein the poly(carboxylic acid) polymer (A) is a homopolymer of an α,β-monoethylenically unsaturated carboxylic acid or copolymer of at least two types of α,β-monoethylenically unsaturated carboxylic acids or a mixture of at least two such polymers, wherein said α,β-monoethylenically unsaturated carboxylic acid is selected from the group consisting of acrylic acid, methacrylic acid, itaconic acid, maleic acid, fumaric acid and crotonic acid, and wherein the precursor film layer exhibits a peak ratio ($A_{1560}/A_{1700}$) of a height $A_{1560}$ of an absorption peak at a wave number of 1560 $cm^{-1}$ to a height $A_{1700}$ of an absorption peak at a wave number of 1700 $cm^{-1}$ as determined by infrared absorption spectrum which is less than 0.25; and thereafter
(2) exposing the precursor film formed according to step (1) to an atmosphere having a relative humidity of at least 20% for a time sufficient to form a polyvalent metal salt of a carboxylic acid by reaction of the carboxyl groups of the poly(carboxylic acid) polymer (A) with the polyvalent metal compound (B) thereby resulting in a peak ratio ($A_{1560}/A_{1700}$) of the film of at least 0.25.

19. The process according to claim 18, wherein step (1) comprises forming the precursor film layer from a mixture of the poly(carboxylic acid) polymer (A) and the polyvalent metal compound (B).

20. The process according to claim 19, wherein step (1) is practiced such that a chemical equivalent of the polyvalent metal compound (B) to the carboxyl groups contained in the poly(carboxylic acid) polymer (A) is at least 0.2.

21. The process according to claim 18, wherein step (1) comprises forming the precursor film layer of multiple layers, wherein one of the layers (a) is formed from the poly(carboxylic acid) polymer (A) and wherein another layer (b) is formed from the polyvalent metal compound (B) and adjoins the layer (a).

22. The process according to claim 21, wherein step (1) is practiced such that said one layer (a) formed from the poly(carboxylic acid) polymer (A) and said another layer (b) formed from the polyvalent metal compound (B) are alternately and adjoiningly arranged in order of (a)/(b), (b)/(a)/(b) or (a)/(b)/(a).

23. The process according to claim 21, wherein step (1) is practiced so as to provide a chemical equivalent of the total (Bt) of the whole polyvalent metal compound (B) to the total (At) of carboxyl groups contained in the poly(carboxylic acid) polymer (A) based on all adjoining layers (a) and (b) which is at least 0.2.

24. The process according to claim 18, wherein the poly(carboxylic acid) polymer (A) exhibits an oxygen permeation coefficient of at most 1,000 $cm^3(STP)\cdot\mu m/(m^2\cdot day\cdot MPa)$ as measured through a film formed solely of the poly(carboxylic acid) polymer (A) under dry conditions of a temperature of 30° C. and a relative humidity of 0%.

25. The process according to claim 18, wherein the polyvalent metal compound (B) is a divalent metal compound.

26. The process according to claim 18, wherein step (1) is practiced so that the film layer has a thickness of 0.001 μm to 1 mm.

* * * * *